US012755706B2

(12) United States Patent
Seo et al.

(10) Patent No.: US 12,755,706 B2
(45) Date of Patent: Oct. 6, 2026

(54) DISPLAY DEVICE AND ELECTRONIC DEVICE INCLUDING THE SAME

(71) Applicant: SAMSUNG DISPLAY CO., LTD., Yongin-si (KR)

(72) Inventors: Hae-Kwan Seo, Yongin-si (KR); Yu-Chol Kim, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 19/182,726

(22) Filed: Apr. 18, 2025

(65) Prior Publication Data

US 2026/0073875 A1 Mar. 12, 2026

(30) Foreign Application Priority Data

Sep. 6, 2024 (KR) ........................ 10-2024-0121467

(51) Int. Cl.
*G09G 3/3266* (2016.01)
*G06F 3/01* (2006.01)
(Continued)

(52) U.S. Cl.
CPC ......... *G09G 3/3266* (2013.01); *G09G 3/3233* (2013.01); *G06F 3/013* (2013.01); *G06F 3/0488* (2013.01); *G06F 3/167* (2013.01); *G09G 3/035* (2020.08); *G09G 2300/0819* (2013.01); *G09G 2300/0842* (2013.01); *G09G 2300/0861* (2013.01); *G09G 2310/0221* (2013.01); *G09G 2310/0286* (2013.01); *G09G 2310/08* (2013.01);
(Continued)

(58) Field of Classification Search
CPC .... G09G 3/3266; G09G 3/3233; G09G 3/035; G09G 2300/0819; G09G 2300/0842; G09G 2300/0861; G09G 2310/0221; G09G 2310/0286; G09G 2310/08; G09G 2320/0238; G09G 2330/021; G09G 2354/00; G06F 3/013; G06F 3/0488; G06F 3/167
See application file for complete search history.

(56) References Cited

U.S. PATENT DOCUMENTS 11,244,629 B2 2/2022 Cho et al.
11,574,584 B2 2/2023 Kim et al.
(Continued)

FOREIGN PATENT DOCUMENTS

KR 10-2021-0043773 A 4/2021
KR 10-2022-0001032 A 1/2022
(Continued)

*Primary Examiner* — Andrew Sasinowski
(74) *Attorney, Agent, or Firm* — F. CHAU & ASSOCIATES, LLC

(57) ABSTRACT

A display device includes a plurality of pixels connected to scan lines and data lines, a data driving circuit that outputs data signals to the pixels via the data lines, a scan driving circuit that sequentially activates at least some pixels via the scan lines, and a driving controller that controls both circuits. The display panel includes a first display area with first pixels and a second display area with second pixels. The scan driving circuit activates both display areas at a first scan rate in a first operation mode and activates the second display area at a second scan rate in a second operation mode, where the second scan rate is lower than the first scan rate.

20 Claims, 17 Drawing Sheets

(51) Int. Cl.

| | |
|---|---|
| ***G06F 3/0488*** | (2022.01) |
| ***G06F 3/16*** | (2006.01) |
| ***G09G 3/00*** | (2006.01) |
| ***G09G 3/3233*** | (2016.01) |

(52) U.S. Cl.

CPC ............... *G09G 2320/0238* (2013.01); *G09G 2330/021* (2013.01); *G09G 2354/00* (2013.01)

(56) References Cited

U.S. PATENT DOCUMENTS

| | | | | |
|---|---|---|---|---|
| 11,749,152 | B2 | 9/2023 | Seo et al. | |
| 12,106,720 | B2 * | 10/2024 | Lee ...................... | G09G 3/2096 |
| 2021/0407399 | A1 | 12/2021 | Kim et al. | |
| 2022/0148503 | A1 | 5/2022 | Seo et al. | |
| 2023/0162664 | A1 * | 5/2023 | Kim ..................... | G09G 3/3266 345/55 |
| 2023/0402013 | A1 * | 12/2023 | Lim ..................... | G09G 3/3266 |
| 2024/0395190 | A1 * | 11/2024 | No ........................... | G09G 3/32 |
| 2025/0169312 | A1 * | 5/2025 | Park ..................... | H10K 59/131 |

FOREIGN PATENT DOCUMENTS

| | | | |
|---|---|---|---|
| KR | 10-2022-0064463 | A | 5/2022 |
| KR | 10-2022-0158918 | A | 12/2022 |

* cited by examiner

DISPLAY DEVICE AND ELECTRONIC DEVICE INCLUDING THE SAME

CROSS-REFERENCE TO RELATED APPLICATIONS

This application claims priority under 35 U.S.C. § 119 to Korean Patent Application No. 10-2024-0121467, filed on Sep. 6, 2024 in the Korean Intellectual Property Office, the disclosure of which is incorporated by reference herein in its entirety.

TECHNICAL FIELD

Embodiments of the present disclosure relate to a display device, and more particularly, a display device capable of segmented driving of display areas.

DISCUSSION OF RELATED ART

A display device provides information to users by displaying various images on a display screen. Typically, a display device operates within a defined screen area, referred to as a display area, where visual content is shown. Modern display devices are evolving to incorporate multiple display areas, enabling greater functionality. For example, some display devices are designed not only to display images on the front surface, but also to include a rear display area, allowing images to be shown on both sides. This multi-display configuration improves the utilization and versatility of the display device.

In recent years, flexible display devices with bendable display panels have been introduced. Unlike traditional flat-panel displays, these flexible display devices can be folded, rolled, or bent, offering increased portability and adaptability beyond conventional screen size limitations. This flexibility may improve user convenience by making the device more compact and versatile. Moreover, integrating multiple display areas with a flexible display panel further expands the device's functionality. For example, when unfolded, the display device can present images on both the front and rear surfaces, and when folded, the display device can restrict image display to the rear display area, providing users with additional ways to interact with content and improving overall usability.

SUMMARY

An object of the present disclosure is to provide a display device capable of segmented driving of a plurality of display areas. Moreover, embodiments of the present disclosure may provide a display device capable of reducing power consumption in an environment where some of the plurality of display areas are driven.

According to an embodiment of the present disclosure, a display device includes a plurality of scan lines, a plurality of data lines, a display panel including a plurality of pixels connected to the plurality of scan lines and the plurality of data lines, a data driving circuit configured to output a plurality of data signals to the plurality of pixels via the plurality of data lines, a scan driving circuit configured to sequentially activate at least some of the plurality of pixels according to the data signals via the plurality of scan lines, and a driving controller configured to control the data driving circuit and the scan driving circuit. The display panel includes a first display area in which first pixels of the plurality of pixels are disposed and a second display area in which second pixels of the plurality of pixels are disposed. The scan driving circuit is further configured to activate the first display area and the second display area at a first scan rate in a first operation mode and to activate the second display area at a second scan rate in a second operation mode. The second scan rate is lower than the first scan rate.

In an embodiment, the driving controller is configured to output a first clock signal to the scan driving circuit in the first operation mode and to output a second clock signal to the scan driving circuit in the second operation mode, and a frequency of the second clock signal is lower than a frequency of the first clock signal.

In an embodiment, a reduction ratio of the frequency of the second clock signal relative to the frequency of the first clock signal is equal to a reduction ratio of the second scan rate relative to the first scan rate.

In an embodiment, the scan driving circuit is configured to, in the first operation mode, output a first scan signal having a first pulse width to the plurality of scan lines to activate the first display area and the second display area and to, in the second operation mode, output a second scan signal having a second pulse width to the scan lines connected to the second pixels among the plurality of scan lines to activate the second display area, and the first pulse width is smaller than the second pulse width.

In an embodiment, a scan time for which the scan driving circuit activates the first display area and the second display area in the first operation mode is equal to a scan time for which the scan driving circuit activates the second display area in the second operation mode.

In an embodiment, the second scan rate is lower than the first scan rate by a ratio corresponding to a proportion of a number of the second pixels among the plurality of pixels.

In an embodiment, the scan driving circuit is configured to, in the second operation mode, sequentially activate the second display area in response to a start signal indicating a beginning of a frame, to deactivate the first display area in response to a masking signal indicating completion of activation of the second display area, and to reactivate the second display area.

In an embodiment, the driving controller is configured to provide the start signal to the scan driving circuit when the first display area is deactivated in response to the masking signal.

In an embodiment, the driving controller is further configured to provide, in the first operation mode, a first image data signal of the first display area and the second display area corresponding to one frame to the data driving circuit during a time for activating all of the plurality of scan lines, and provide, in the second operation mode, a second image data signal of the second display area corresponding to a plurality of frames to the data driving circuit during the time for activating all of the plurality of scan lines.

In an embodiment, the scan driving circuit is further configured to sequentially activate the second pixels in the second display area row by row in the first operation mode before sequentially activating the first pixels in the first display area row by row.

According to an embodiment of the present disclosure, a display device includes a plurality of scan lines, a plurality of data lines, a display panel including a plurality of pixels connected to the plurality of scan lines and the plurality of data lines, a data driving circuit configured to output a plurality of data signals to the plurality of pixels via the plurality of data lines, a scan driving circuit configured to activate at least some of the plurality of pixels according to the data signals via the plurality of scan lines, and a driving controller configured to control the data driving circuit and the scan driving circuit based on an image signal and a synchronization signal. The display panel includes a first display area in which first pixels of the plurality of pixels are disposed and a second display area in which second pixels of the plurality of pixels are disposed. The data driving circuit is configured, in a first operation mode, to output a data signal of the first display area and the second display area corresponding to one frame to the display panel during a frame section defined by the synchronization signal and, in a second operation mode, to output a data signal of the second display area corresponding to a plurality of sub-frames to the display panel during the frame section.

In an embodiment, the driving controller is further configured to output a start signal to the scan driving circuit in the second operation mode, and the start signal indicates a beginning of each of the plurality of sub-frames during the frame section.

In an embodiment, the frame section in the first operation mode lasts for a first duration, and the frame section in the second operation mode lasts for a second duration, and the second duration is longer than the first duration.

In an embodiment, the data driving circuit is configured, in the second operation mode, to output the data signal of the second display area corresponding to one of the plurality of sub-frames to the display panel during the first duration.

In an embodiment, the driving controller is further configured to output a first clock signal to the data driving circuit in the first operation mode and to output a second clock signal to the data driving circuit in the second operation mode, and a frequency of the second clock signal is lower than a frequency of the first clock signal.

According to an embodiment of the present disclosure, an electronic device includes a processor, a memory having stored application programs for execution by the processor, and a display device. The display device includes a plurality of scan lines, a plurality of data lines, a display panel including a plurality of pixels connected to the plurality of scan lines and the plurality of data lines, a data driving circuit configured to output a plurality of data signals to the plurality of pixels via the plurality of data lines, a scan driving circuit configured to sequentially activate at least some of the plurality of pixels according to the data signals via the plurality of scan lines, and a driving controller configured to control the data driving circuit and the scan driving circuit. The display panel includes a first display area in which first pixels of the plurality of pixels are disposed and a second display area in which second pixels of the plurality of pixels are disposed. The scan driving circuit is further configured to activate the first display area and the second display area at a first scan rate in a first operation mode and to activate the second display area at a second scan rate in a second operation mode, where the second scan rate is lower than the first scan rate. The electronic device further includes a user interface configured to sense user input via touch or cursor select of an icon presented on the display panel, where the processor is caused to execute one or more of the stored application programs upon receipt of the user input.

In an embodiment, the stored application programs include one or more of a camera application, an audiovisual streaming application, or a telephone application.

In an embodiment, the user interface is a touch screen embedded in the display panel, wherein the touch screen includes touch sensors for sensing a touch or a tap by a user.

In an embodiment, the user interface includes an audio sensor embedded in the display panel, wherein the audio sensor is configured to receive voice commands to cause access to one or more of the application programs.

In an embodiment, the user interface includes sensors for sensing eye movements installed in the display panel.

According to an embodiment of the present disclosure, a display device includes a display panel, a data driving circuit, a scan driving circuit, and a driving controller. The display panel may have a first non-folding area, a second non-folding area, and a folding area between the first non-folding area and the second non-folding area defined therein, and may include a plurality of pixels connected to a plurality of scan lines and a plurality of data lines. The data driving circuit may be configured to output a data signal to the plurality of pixels through the plurality of data lines. The scan driving circuit may be configured to sequentially activate pixels to display an image based on the data signal via the plurality of scan lines. The driving controller may be configured to control the data driving circuit and scan driving circuit. A first display area corresponding to first pixels of the plurality of pixels and a second display area corresponding to second pixels of the plurality of pixels are defined in the display panel. The first display area may overlap the first non-folding area, the second non-folding area, and the folding area, and the second display area may overlap the first non-folding area. The scan driving circuit may be configured to activate the first display area and the second display area at a first scan rate while the display panel is unfolded and to activate the second display area at a second scan rate, which is lower than the first scan rate, while the display panel is folded at an angle greater than a reference angle.

In an embodiment, the first display area and the second display area may be arranged to face each other on a plane in the first non-folding area.

In an embodiment, the first display area and the second display area may not overlap each other on a plane.

In an embodiment, the first display area and the second display area may be spaced apart from each other, but the first pixels and the second pixels may be connected to each other through the plurality of data lines.

In an embodiment, the area of the first display area may be larger than that of the second display area.

According to an embodiment of the present disclosure, an electronic device may include a display device including a display panel, a data driving circuit, a scan driving circuit, and a driving controller. The display panel may include a plurality of pixels connected to a plurality of scan lines and a plurality of data lines. The data driving circuit may be configured to output data signals to the plurality of pixels through the plurality of data lines. The scan driving circuit may be configured to sequentially activate pixels to display an image according to the data signals via the plurality of scan lines. The driving controller may be configured to control the data driving circuit and the scan driving circuit. A first display area corresponding to first pixels among the plurality of pixels and a second display area corresponding to second pixels among the plurality of pixels may be defined in the display panel. The scan driving circuit may be configured to activate the first and second display areas at a first scan rate in a first operation mode and to activate the second display area at a second scan rate in a second operation mode, the second scan rate being slower than the first scan rate.

According to an embodiment of the present disclosure, an electronic device may include a display device including a display panel, a data driving circuit, a scan driving circuit, and a driving controller. The display panel may include a plurality of pixels connected to a plurality of scan lines and a plurality of data lines. The data driving circuit may be configured to output a data signal to the plurality of pixels through the plurality of data lines. The scan driving circuit may be configured to sequentially activate pixels via the plurality of scan lines to display an image corresponding to the data signal. The driving controller may be configured to control the data driving circuit and the can driving circuit based on an image signal and a synchronization signal. A first display area corresponding to first pixels of the plurality of pixels and a second display area corresponding to second pixels of the plurality of pixels may be defined in the display panel. The data driving circuit may be configured, in a first operation mode, to output a data signal of the first display area and the second display area corresponding to one frame to the display panel during a frame section defined by the synchronization signal and to output a data signal of the second display area corresponding to a plurality of sub-frames to the display panel during the frame section in a second operation mode.

According to an embodiment of the present disclosure, an electronic device may include a display device including a display panel, a data driving circuit, a scan driving circuit, and a driving controller. The display panel may have a first non-folding area, a second non-folding area, and a folding area between the first non-folding area and the second non-folding area defined therein, and may include a plurality of pixels connected to a plurality of scan lines and a plurality of data lines. The data driving circuit may be configured to output a data signal to the plurality of pixels through the plurality of data lines. The scan driving circuit may be configured to sequentially activate pixels to display an image based on the data signal via the plurality of scan lines. The driving controller may be configured to control the data driving circuit and scan driving circuit. A first display area corresponding to first pixels of the plurality of pixels and a second display area corresponding to second pixels of the plurality of pixels are defined in the display panel. The first display area may overlap the first non-folding area, the second non-folding area, and the folding area, and the second display area may overlap the first non-folding area. The scan driving circuit may be configured to activate the first display area and the second display area at a first scan rate while the display panel is unfolded and to activate the second display area at a second scan rate, which is slower than the first scan rate, while the display panel is folded at an angle greater than a reference angle.

According to an embodiment of the present disclosure, by intensively configuring a plurality of sub-frames in a specific display area during a time duration for constituting one frame, it becomes possible to prevent unnecessary image from being driven when driving only some of a plurality of display areas.

Moreover, according to an embodiment of the present disclosure, by lowering the clock frequency, it becomes possible to reduce power consumption while maintaining the operating speed of the display device when intensively driving some of a plurality of display areas with a plurality of sub-frames.

BRIEF DESCRIPTION OF THE DRAWINGS

The above and other features of the present disclosure will become more apparent by describing in detail embodiments thereof with reference to the accompanying drawings in which.

DETAILED DESCRIPTION

Figure 1A:
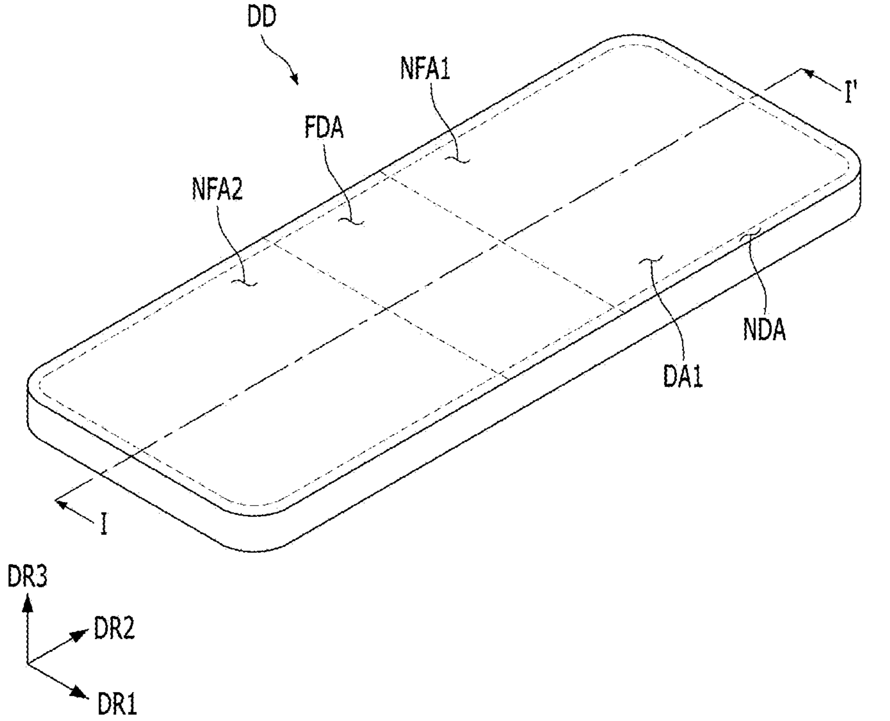
FIGS. 1A and 1B are perspective views of a display device according to an embodiment of the present disclosure.

Embodiments of the present disclosure will be described more fully hereinafter with reference to the accompanying drawings. Like reference numerals may refer to like elements throughout the accompanying drawings.

It will be understood that the terms "first," "second," "third," etc. are used herein to distinguish one element from another, and the elements are not limited by these terms. Thus, a "first" element in an embodiment may be described as a "second" element in another embodiment.

It should be understood that descriptions of features or aspects within each embodiment should typically be considered as available for other similar features or aspects in other embodiments, unless the context clearly indicates otherwise.

As used herein, the singular forms "a", "an" and "the" are intended to include the plural forms as well, unless the context clearly indicates otherwise.

The terms of a singular form may include plural forms unless the context clearly indicates otherwise.

As used herein, the term "and/or" includes any and all combinations of one or more of the associated listed items. Expressions such as "at least one of," when preceding a list of elements, modify the entire list of elements and do not modify the individual elements of the list.

Spatially relative terms, such as "beneath", "below", "lower", "under", "above", "upper", etc., may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below.

It will be understood that when a component is referred to as being "on", "connected to", "coupled to", or "adjacent to" another component, it can be directly on, connected, coupled, or adjacent to the other component, or intervening components may be present. It will also be understood that when a component is referred to as being "between" two components, it can be the only component between the two components, or one or more intervening components may also be present. It will also be understood that when a component is referred to as "covering" another component, it can be the only component covering the other component, or one or more intervening components may also be covering the other component. Other words used to describe the relationships between components should be interpreted in a like fashion.

The terms "about" or "approximately" as used herein are inclusive of the stated value and means within an acceptable range of deviation for the particular value as determined by one of ordinary skill in the art, considering the measurement in question and the error associated with measurement of the particular quantity (e.g., the limitations of the measurement system). For example, "about" or "approximately" can mean within one or more standard deviations, or within, for example, ±30%, 20%, 10% or 5% of the stated value.

An expression such as "comprising" or "including" is intended to designate a characteristic, a number, a step, an operation, an element, a part or combinations thereof, and shall not be construed to preclude any possibility of presence or addition of one or more other characteristics, numbers, steps, operations, elements, parts or combinations thereof.

Embodiments of the present application provide a display device that improves power consumption and display efficiency by selectively driving certain display areas while preventing unnecessary image driving. This may be implemented by configuring multiple sub-frames within a specific display area during a single frame duration. By doing so, embodiments may allow only the necessary portions of the display to be actively updated, which may reduce overall processing and energy requirements.

Embodiments of the present application provide a method of controlling the display operation in a partial operating mode. For example, the driving controller may lower the clock frequency when operating in this mode, while the scan driving circuit may activate only a specific display area at a lower scan rate. Simultaneously, the data driving circuit may output a data signal for that specific display area using multiple sub-frames within the defined frame section. This coordinated approach may allow for efficient image rendering while maintaining the display device's operating speed and reducing power consumption, including, for example, in foldable or multi-area display configurations.

By implementing the above techniques, embodiments of the present application may improve the usability of modern display devices including, for example, display devices that include multiple display areas, such as foldable or dual-sided displays. The ability to dynamically adjust the scan rate and clock frequency in partial operating modes provides improvements with relation to power management, making the display device more energy-efficient without sacrificing image quality or responsiveness.

Figure 1B:
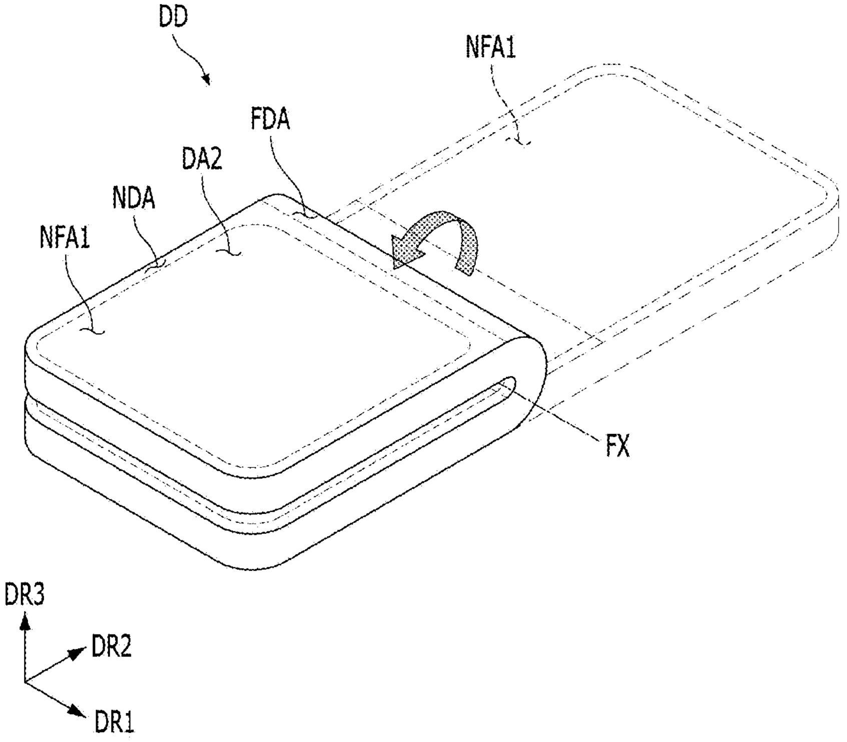

FIGS. 1A and 1B are perspective views of a display device DD according to an embodiment of the present disclosure. FIG. 1A shows the unfolded state of the display device DD, while FIG. 1B shows the folded state of the display device DD.

The display device DD may be, for example, but is not limited to, a mobile phone. For example, the display device DD may be used in various portable electronic devices such as a tablet PC, a smartphone, a personal digital assistant (PDA), a portable multimedia player (PMP), or a gaming device. Additionally, the display device DD may be used in a variety of electronic devices, including, for example, televisions, personal computers, laptop computers, and kiosks.

Referring to FIG. 1A, the display device DD includes a first display area DA1 and a non-display area NDA. The display device DD may be configured to display an image in the first display area DAL. In the unfolded state of the display device DD, the first display area DA1 may have a display surface parallel to a plane defined by a first direction DR1 and a second direction DR2. The first display area DA1 is configured to display an image in a third direction DR3, which is perpendicular to the display surface and corresponds to a thickness direction of the display device DD. The non-display area NDA is adjacent to (e.g., surrounds) the first display area DA1 and may provide a border portion of the display device DD. The non-display area NDA may be printed in a predetermined color. The non-display area NDA may be defined as a bezel area.

The display device DD may include a folding area FDA and a plurality of non-folding areas NFA1, NFA2. The folding area FDA may be disposed between a first non-folding area NFA1 and a second non-folding area NFA2. The folding area FDA and the first and second non-folding areas NFA1, NFA2 may be arranged along the second direction DR2. The first display area DA1 may overlap, in a planar view, with the folding area FDA and the first and second non-folding areas NFA1, NFA2.

Referring to FIG. 1B, as the folding area FDA bends, the display device DD may be folded. The folding area FDA may be foldable about a folding axis FX, in which case the first non-folding area NFA1 and the second non-folding area NFA2 may face each other along the third direction DR3. When the display device DD is folded, it may undergo in-folding such that the display surface remains concealed.

The display device DD includes a second display area DA2 and a non-display area NDA. The display device DD may also be configured to display an image through the second display area DA2. In the folded state of the display device DD, the second display area DA2 may have a display surface parallel to a plane defined by the first direction DR1 and the second direction DR2. The display device DD may also display an image through the second display area DA2. The non-display area NDA may be disposed adjacent to (e.g., surround) the second display area DA2. The second display area DA2 may overlap, in a planar view, with the first non-folding area NFA1.

In the unfolded state, the first display area DA1 is formed on a front surface of the display device DD, while the second display area DA2 is formed on a rear surface of the display device DD. The first display area DA1 and the second display area DA2 may overlap at the first non-folding area NFA1. In the unfolded state, since both the first display area DA1 and the second display area DA2 are visible, they may display images simultaneously. In the folded state, since the first display area DA1 is not visible, only the second display area DA2 may display an image. This will be described in further detail below.

Figure 2:
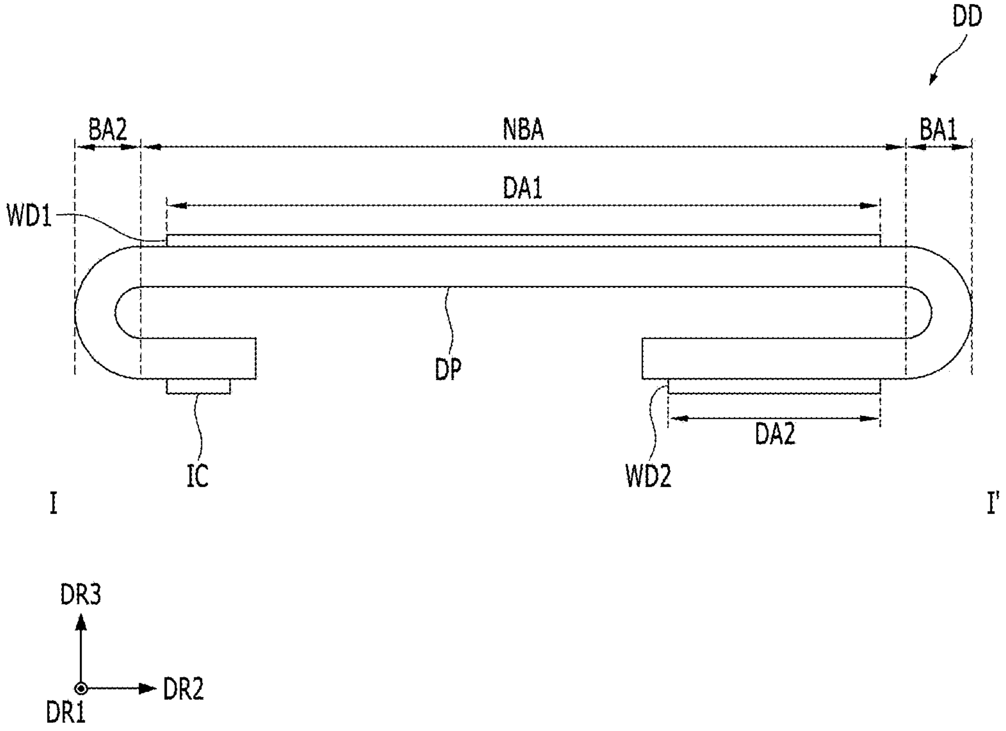
FIG. 2 is an exemplary cross-sectional view of the display device along line I-I' of FIG. 1.

FIG. 2 is an exemplary cross-sectional view of the display device corresponding to line I-I' in FIG. 1.

Referring to FIG. 2, the display device DD may include a display panel DP, windows WD1, WD2, and a driving integrated circuit IC. It should be appreciated that the elements included in the display device DD are simplified to focus on the display panel DP, and additional elements included in the display device DD are not illustrated. For example, the display device DD may further include a housing for accommodating the display panel, a touch panel for providing user input, and an application processor configured to supply image signals and control signals to the driving integrated circuit IC.

The display panel DP may include bending areas BA1, BA2 and a non-bending area NBA. The non-bending area NBA may overlap the first display area DA1 and the second display area DA2. The first window WD1 is disposed on the display panel DP to cover the first display area DAL. The second window WD2 is disposed on the display panel DP to cover the second display area DA2. The first window WD1 and the second window WD2 may further extend in the first direction DR1 and the second direction DR2 to cover the non-display area NDA of the display panel DP.

The first bending area BA1 may be bent with a predetermined curvature between the first display area DA1 and the second display area DA2. As a result, the single display panel DP may be used to form both the first display area DA1 on the front of the display device DD and the second display area DA2 on the rear of the display device DD. The first display area DA1 and the second display area DA2 may be driven together through the driving integrated circuit IC.

The second bending area BA2 may be bent with a predetermined curvature such that the driving integrated circuit IC is positioned on the rear of the display device DD. The driving integrated circuit IC may be arranged to overlap the non-bending area NBA at one end of the display panel DP extending further from the second bending area BA2. The driving integrated circuit IC is configured to drive the display panel DP such that the first display area DA1 and the second display area DA2 display images, which will be described in further detail below.

Figure 3:
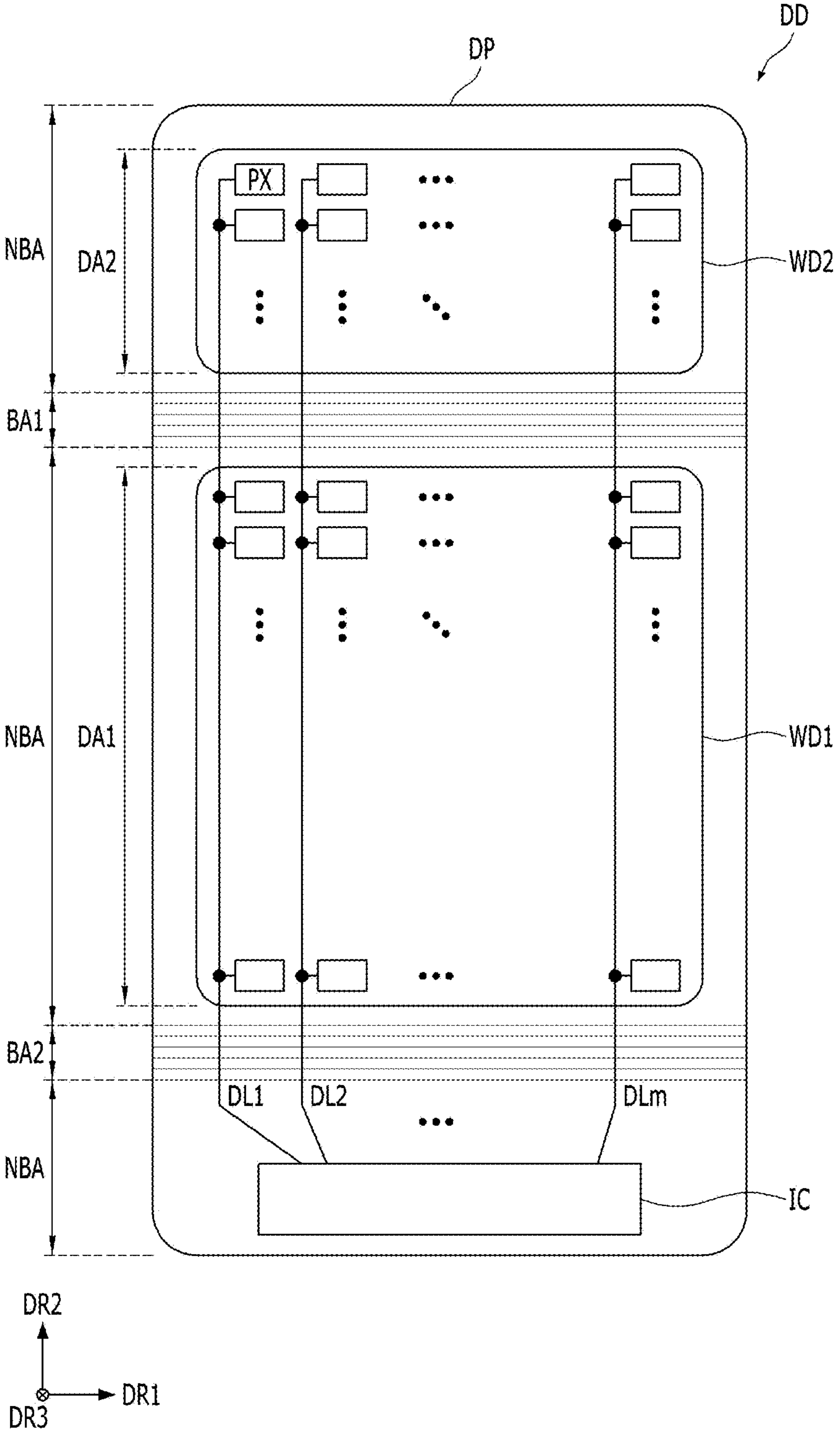
FIG. 3 is an exemplary plan view of the display device shown in FIG. 2 in an unfolded state.

FIG. 3 is an exemplary plan view of the display device in FIG. 2, showing the display device with the bending areas unfolded.

Referring to FIG. 3, the display device DD may include the display panel DP, the windows WD1, WD2, and the driving integrated circuit IC. The display panel DP, the windows WD1, WD2, and the driving integrated circuit IC shown in FIG. 3 correspond, respectively, to the display panel DP, the windows WD1, WD2, and the driving integrated circuit IC in FIG. 2. It shall be appreciated that the plan view in FIG. 3 is a plan view of the display panel DP in FIG. 2 with the first bending area BA1 and the second bending area BA2 unfolded.

The display panel DP may include a plurality of data lines DL1-DLm and a plurality of pixels PX, where m is a positive integer. The pixels PX are electrically connected, respectively, to the data lines DL1-DLm. The pixels PX may be configured to receive data signals for displaying images from the driving integrated circuit IC through the data lines DL1-DLm. Some of the pixels PX may be disposed in the first display area DA1, while others may be disposed in the second display area DA2. For example, the first display area DA1 may be larger than the second display area DA2, and correspondingly, the number of pixels PX arranged in the first display area DA1 may be greater than the number of pixels PX arranged in the second display area DA2.

The first display area DA1 and the second display area DA2 are configured to be driven through the single driving integrated circuit IC on the single display panel DP. To this end, the pixels PX arranged in the same column may be electrically connected to one of the data lines DL1-DLm, regardless of whether the pixels PX are disposed in the first display area DA1 or the second display area DA2. In this case, compared to implementing the first display area DA1 and the second display area DA2 with different driving integrated circuits on separate display panels, the thickness of the display device DD may be reduced, and the interface and data load for image signal transfer and driving may be lessened. However, when the first display area DA1 and the second display area DA2 are driven on the single display panel DP, the first display area DA1 may also be driven even when only the second display area DA2 is intended to be active. Specific solutions to address this issue will be described in further detail below.

Figure 4:
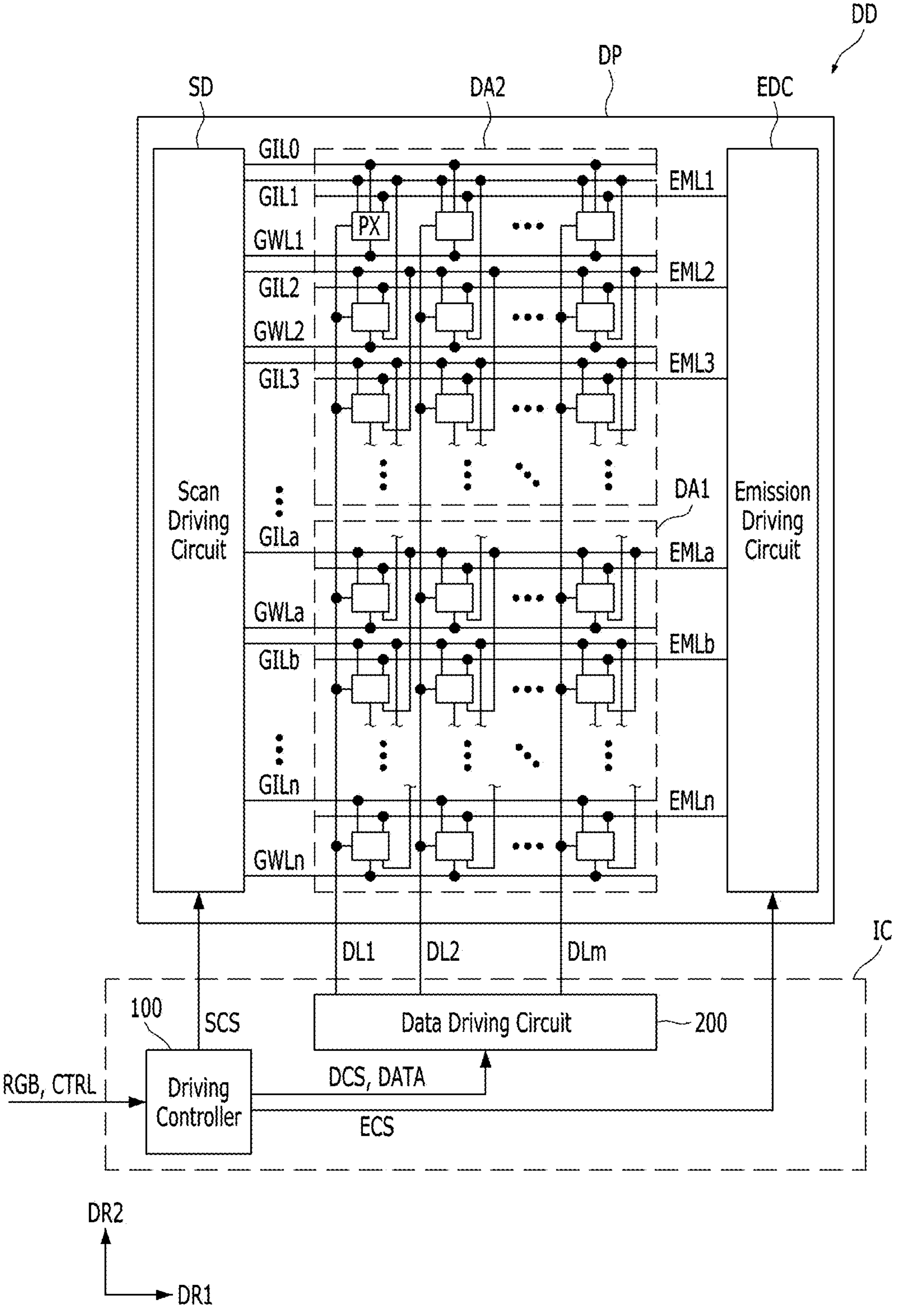
FIG. 4 is a block diagram of a display device according to an embodiment of the present disclosure.

FIG. 4 is a block diagram of a display device DD according to an embodiment of the present disclosure.

Referring to FIG. 4, the display device DD may include a display panel DP and a driving integrated circuit IC. The display panel DP and the driving integrated circuit IC correspond, respectively, to the display panel DP and the driving integrated circuit IC shown in FIGS. 2 and 3. The display device DD is not limited to the configuration shown in FIG. 4 and may further include additional elements. For example, the display device DD may further include a voltage generator for generating voltages utilized for the display panel DP and the driving integrated circuit IC.

The driving integrated circuit IC may be configured to drive the display panel DP such that images are displayed. The driving integrated circuit IC may include a driving controller 100 (also referred to as a driving controller circuit) and a data driving circuit 200. The driving controller 100 and data driving circuit 200 may be implemented as, but are not limited to, a single embedded integrated circuit. For example, the driving controller 100 and the data driving circuit 200 may also be implemented as separate chips.

The driving controller 100 is configured to receive an image signal RGB and a control signal CTRL. For example, the image signal RGB and the control signal CTRL may be provided by an application processor. The image signal RGB shall be understood as the graphical source of the image to be displayed on the display panel DP. The control signal CTRL may include a synchronization signal to synchronize the image output to a precise location on the display panel DP. The synchronization signal may include, for example, a vertical synchronization signal for separating frames, a horizontal synchronization signal for separating rows, and a data enable signal to differentiate the output intervals of the image data. Moreover, the control signal CTRL may further include a system clock signal and a signal relating to the operation mode of the display device DD.

The driving controller 100 is configured to generate an image data signal DATA, in which the data format of the image signal RGB is converted to conform to the interface specifications of the data driving circuit 200. The driving controller 100 may be configured to generate a scan control signal SCS for controlling a scan driving circuit SD, an emission driving control signal ECS for controlling the emission driving circuit EDC, and a data control signal DCS for controlling the data driving circuit 200, based on the control signal CTRL.

The data driving circuit 200 may be configured to receive the data control signal DCS and the image data signal DATA from the driving controller 100. The data driving circuit 200 may be configured to convert the digital image data signal DATA to an analog data signal. The data signals may be converted to correspond to the gradation values of the image data signal DATA. The data driving circuit 200 may be electrically connected to a plurality of data lines DL1-DLm, as will be described in further detail below, and may output the converted data signals to the plurality of data lines DL1-DLm.

The display panel DP may include a plurality of first scan lines GIL0-GILn, a plurality of second scan lines GWL1-GWLn, a plurality of emission control lines EML1-EMLn, a plurality of data lines DL1-DLm, and a plurality of pixels PX, where each of n and m is a positive integer. The display panel DP may further include a scan driving circuit SD connected to the first scan lines GIL0-GILn and the second scan lines GWL1-GWLn and an emission driving circuit EDC connected to the emission control lines EML1-EMLn.

The first scan lines GIL0-GILn, the second scan lines GWL1-GWLn, and the emission control lines EML1-EMLn extend from the scan driving circuit SD in the first direction DR1. The first scan lines GIL0-GILn, the second scan lines GWL1-GWLn, and the emission control lines EML1-EMLn are spaced apart from one another in the second direction DR2. The data lines DL1-DLm extend from the data driving circuit 200 in the second direction DR2 and are spaced apart from one another in the first direction DR1.

A plurality of pixels PX are electrically connected, respectively, to the first scan lines GIL0-GILn, the second scan lines GWL1-GWLn, the emission control lines EML1-EMLn, and the data lines DL1-DLm. For example, each of the plurality of pixels PX may be connected to four lines extending in the first direction DR1 and to one data line extending in the second direction DR2. The circuit configuration and operation of each of the plurality of pixels PX will be described in further detail below.

The scan driving circuit SD is configured to receive the scan control signal SCS from the driving controller 100. In response to the scan control signal SCS, the scan driving circuit SD may be configured to output first scan signals to the first scan lines GIL0-GILn and output second scan signals to the second scan lines GWL1-GWLn. The scan driving circuit SD may be configured to sequentially activate the plurality of pixels PX row by row through the first and second scan signals. Here, activation refers to a state where data signals can be input to the plurality of pixels PX through the data lines DL1-DLm. The circuit configuration and operation of the scan driving circuit SD will be described in further detail below.

The emission driving circuit EDC is configured to receive the emission driving control signal ECS from the driving controller 100. The emission driving circuit EDC may be configured to output emission control signals to the emission control lines EML1-EMLn in response to the emission driving control signal ECS. The emission driving circuit EDC may be configured to sequentially cause the plurality of pixels PX to emit light row by row through the emission control signals.

The display panel DP may include the first display area DA1 and the second display area DA2. The first display area DA1 corresponds to the first display area DA1 shown in FIGS. 1A, 2, and 3, and the second display area DA2 corresponds to the second display area DA2 shown in FIGS. 1B, 2, and 3. For example, by bending the display panel DP, the first display area DA1 and the second display area DA2 may be positioned to face each other on different faces of the display device DD.

The first display area DA1 may be configured to display an image through first pixels among the plurality of pixels PX. The second display area DA2 may be configured to display an image through second pixels, which are different from the first pixels, among the plurality of pixels PX. The number of first pixels and the number of second pixels may differ. For example, the number of first pixels may be greater than the number of second pixels. The number of first pixels and the number of second pixels may determine, respectively, the area of the first display area DA1 and the area of the second display area DA2. As shown in FIGS. 1A, 1B, 2, and 3, the first display area DA1 and the second display area DA2 may be spaced apart from each other. Even though the first display area DA1 and the second display area DA2 are spaced apart from each other, the first pixels and the second pixels are connected through the plurality of data lines DL1-DLm.

In the unfolded state of the display device DD as shown in FIG. 1A (hereinafter referred to as a "first operation mode"), the first display area DA1 and the second display area DA2 may be both configured to be activated. Accordingly, the scan driving circuit SD and the emission driving circuit EDC may be configured to sequentially activate and cause light emission in the plurality of pixels PX row by row. Under the structure shown in FIG. 4, the scan driving circuit SD and the emission driving circuit EDC may be configured to sequentially scan and cause light emission in the second pixels included in the second display area DA2 and then sequentially scan and cause light emission in the first pixels included in the first display area DA1.

In the folded state of the display device DD as shown in FIG. 1B (hereinafter referred to as a "second operation mode"), the first display area DA1 is not visible due to the folding, and only the second display area DA2 may be configured to be activated. For example, the folded state may be a state of folding at a predetermined angle that is sufficient to allow the first and second non-folding areas NFA1, NFA2 that overlap the first display area DA1 to face each other. In the second operation mode, the first display area DA1 may be configured to be activated at a relatively low frequency (for example, about 0.1 Hz to about 1 Hz). The scan driving circuit SD and the emission driving circuit EDC may be configured to sequentially scan and emit light from the second pixels included in the second display area DA2 and not to scan the first pixels included in the first display area DA1. To this end, the scan control signal SCS may include a masking signal indicating the start of the first display area DA1. Specific operations of the second operation mode by the masking signal will be described in further detail below.

For example, according to an embodiment, when the display device DD is in an unfolded state, as shown in FIG.

1A (the first operation mode), both the first display area DA1 and the second display area DA2 can be fully activated to display images. The scan driving circuit SD and the emission driving circuit EDC work together to sequentially activate the pixels PX row by row, allowing images to be properly rendered across the entire display panel DP. Under the structural configuration depicted in FIG. 4, the scan driving circuit SD and emission driving circuit EDC may first scan and activate the pixels PX in the second display area DA2 before scanning and activating the pixels PX in the first display area DA1. This sequential scanning method may help maintain uniformity in display performance and mitigate issues related to power distribution and refresh synchronization across multiple display areas. Furthermore, this arrangement allows for improved signal processing within a single display panel while ensuring that both display areas operate in unison when necessary.

In contrast, when the display device DD is folded, as shown in FIG. 1B (the second operation mode), the first display area DA1 is no longer externally visible due to the folding, while the second display area DA2 remains exposed and continues displaying images. The folding process positions the first and second non-folding areas NFA1, NFA2 to face each other, effectively concealing the first display area DA1 from view. To improve power efficiency in this state, the first display area DA1 may still be intermittently activated, but at a significantly lower frequency, for example, within a range of about 0.1 Hz to about 1 Hz. This low-frequency activation may be useful for maintaining display readiness while reducing unnecessary power consumption. Meanwhile, the scan driving circuit SD and emission driving circuit EDC are configured to selectively activate only the second pixels PX within the second display area DA2 while preventing unnecessary scanning and emission from the first pixels PX in the first display area DA1. This selective activation may be achieved through the use of a masking signal embedded within the scan control signal SCS, which serves to indicate the start of the first display area DAL. By employing this approach, the display device DD can dynamically manage power distribution, prolong battery life, and improve the efficiency of its multi-display operation without compromising the responsiveness of the active display area.

Figure 5:
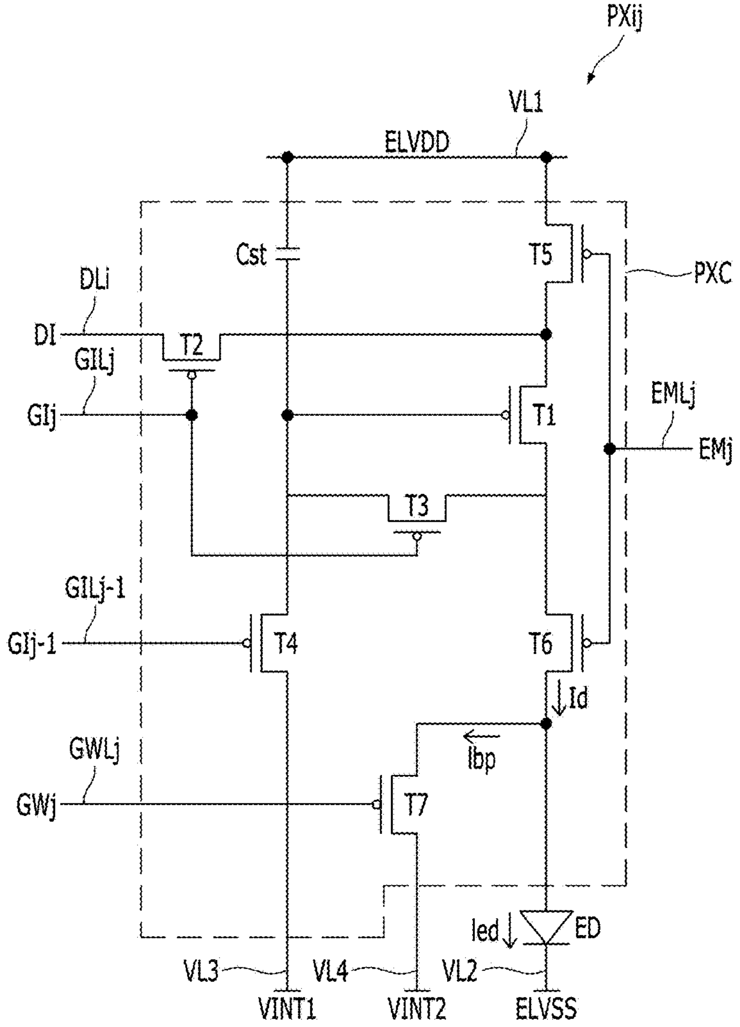
FIG. 5 is an exemplary equivalent circuit diagram of a pixel shown in FIG. 4.

FIG. 5 is an exemplary equivalent circuit diagram of a pixel shown in FIG. 4.

Referring to FIG. 5, a pixel PXij, where each of i and j is a positive integer, is electrically connected to an i-th data line DLi among data lines DL1-DLm, (j−1)-th and j-th scan lines GILj−1, GILj among the first scan lines GIL0-GILn, a j-th scan line GWLj among the second scan lines GWL1-GWLn, and a j-th emission control line EMLj among the emission control lines EML1-EMLn. The pixel PXij corresponds to one of the plurality of pixels PX shown in FIG. 4.

Pixel PXij is configured to receive a first driving voltage ELVDD, a second driving voltage ELVSS, a first initialization voltage VINT1, and a second initialization voltage VINT2. The first driving voltage ELVDD, the second driving voltage ELVSS, the first initialization voltage VINT1, and the second initialization voltage VINT2 may be supplied using voltages generated by, for example, a power management circuit of the display device DD. For example, the first initialization voltage VINT1 and the second initialization voltage VINT2 may be converted by the driving controller 100 from voltages generated by the power management circuit and then transferred to the pixel PXij.

The pixel PXij may include a pixel circuit PXC and a light-emitting element ED. The pixel circuit PXC may include first to seventh transistors T1-T7 and one capacitor Cst. Each of the first to seventh transistors T1-T7 may be a P-type transistor with a low-temperature polycrystalline silicon (LTPS) semiconductor layer, but the present disclosure is not limited to this configuration. For example, in an embodiment, the transistors may instead be N-type transistors with an oxide semiconductor layer. Moreover, in an embodiment, unlike FIG. 5, at least one of the first to seventh transistors T1-T7 may be an N-type transistor, and the others may be P-type transistors. The circuit configuration of the pixel PXij according to embodiments of the present disclosure is not limited to FIG. 5, and the structure of the pixel circuit PXC may be implemented in modified forms.

The first transistor T1 includes a first electrode connected to a first driving voltage line VL1 via the fifth transistor T5, a second electrode electrically connected to an anode of the light-emitting element ED via the sixth transistor T6, and a gate electrode connected to one end of the capacitor Cst. The first transistor T1 may be configured to receive a data signal DI transferred by the data line DLi, according to the switching operation of the second transistor T2, and to supply a driving current Id to the light-emitting element ED.

The second transistor T2 includes a first electrode connected to the data line DLi, a second electrode connected to the first electrode of the first transistor T1, and a gate electrode connected to the j-th first scan line GILj. The second transistor T2 may be configured to be turned on according to a scan signal GIj transferred through the j-th first scan line GILj to transfer the data signal DI received from the data line DLi to the first electrode of the first transistor T1.

The third transistor T3 includes a first electrode connected to the gate electrode of the first transistor T1, a second electrode connected to the second electrode of the first transistor T1, and a gate electrode connected to the j-th first scan line GILj. The third transistor T3 may be configured to be turned on according to the scan signal GIj transferred through the j-th first scan line GILj to diode-connect the gate electrode and the second electrode of the first transistor T1 to the first transistor T1.

The fourth transistor T4 includes a first electrode connected to the gate electrode of the first transistor T1, a second electrode connected to the third voltage line VL3, to which an initialization voltage VINT is transferred, and a gate electrode connected to the (j−1)-th first scan line GILj−1. The fourth transistor T4 is configured to be turned on according to a scan signal GILj−1 transferred through a (j−1)-th first scan line GILj−1 to perform an initialization operation by transferring the first initialization voltage VINT1 to the gate electrode of the first transistor T1 to initialize the voltage of the gate electrode of the first transistor T1.

The fifth transistor T5 includes a first electrode connected to the first driving voltage line VL1, a second electrode connected to the first electrode of the first transistor T1, and a gate electrode connected to the emission control line EMLj. The sixth transistor T6 includes a first electrode connected to the second electrode of the first transistor T1, a second electrode connected to the anode of the light-emitting element ED, and a gate electrode connected to the emission control line EMLj. The fifth transistor T5 and the sixth transistor T6 are configured to be turned on simultaneously according to the emission control signal EMj received through the emission control line EMLj. The first driving voltage ELVDD, applied through the turned-on fifth transistor T5, may be compensated through the diode-connected first transistor T1 and transferred to the light-emitting element ED.

The seventh transistor T7 includes a first electrode connected to the fourth voltage line VL4, to which the second initialization voltage VINT2 is transferred, a second electrode connected to the second electrode of the sixth transistor T6, and a gate electrode connected to the j-th second scan line GWLj. The seventh transistor T7 is configured to be turned on according to the scan signal GWj received through the j-th second scan line GWLj. The second initialization voltage VINT2 may be applied to the anode of the light-emitting element ED for initialization through the turned-on seventh transistor T7.

One end of the capacitor Cst is connected to the gate electrode of the first transistor T1, as described above, and the other end of the capacitor Cst is connected to the first driving voltage line VL1. A cathode of the light-emitting element ED may be connected to the second driving voltage line VL2, which is configured to supply the second driving voltage ELVSS.

The light-emitting element ED may include a light-emitting diode. The light-emitting diode may include, for example, an organic light-emitting material, an inorganic light-emitting material, a quantum dot, or a quantum rod as a light-emitting layer. The light-emitting element ED may be configured to emit light based on an emission current led.

Figure 6:
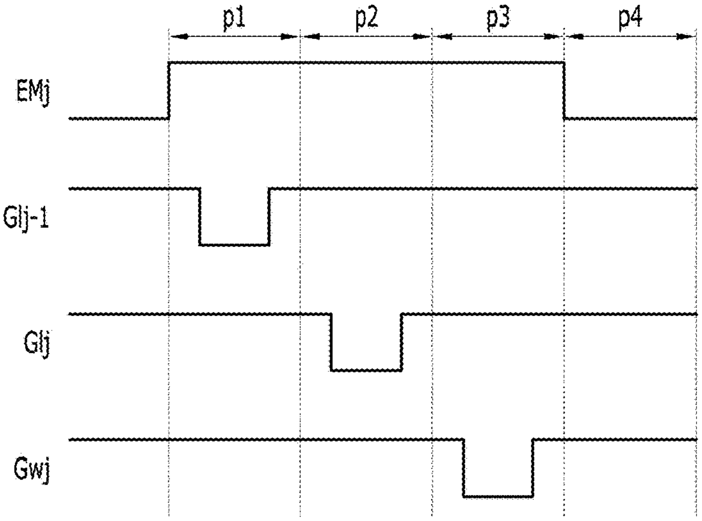
FIG. 6 is a timing diagram illustrating the operation of the pixel shown in FIG. 5.

FIG. 6 is a timing diagram for illustrating the operation of the pixel PX shown in FIG. 5. FIG. 6 will be described with reference to the reference numerals used in FIG. 5.

Referring to FIG. 6, the pixel PXij is operated in a first interval p1, a second interval p2, a third interval p3, and a fourth interval p4 for an emission operation.

In the first interval p1, nodes for programming the pixel PXij are initialized. During the first interval p1, a low-level (j−1)-th first scan signal GIj−1 is provided through the (j−1)-th first scan line GILj−1. In response to the low-level (j−1)-th first scan signal GIj−1, the fourth transistor T4 is turned on, and the first initialization voltage VINT1 is transferred to the gate electrode of the first transistor T1 through the fourth transistor T4, thereby initializing the first transistor T1.

In the second interval p2, the pixel PXij is programmed. When a low-level j-th first scan signal GIj is supplied through the j-th first scan line GILj during the second interval p2, the third transistor T3 is turned on. The first transistor T1 may be diode-connected and forward-biased by the turned-on third transistor T3. Additionally, the second transistor T2 is turned on by the low-level j-th first scan signal GIj. Accordingly, a compensation voltage Di-Vth that is reduced by as much as the threshold voltage Vth of the first transistor T1 from the data signal DI supplied from the data line DLi is applied to the gate electrode of the first transistor T1. This gate voltage shall be understood to be the compensation voltage. The first driving voltage ELVDD and the compensation voltage may be applied to both ends of the capacitor Cst, and a charge corresponding to the voltage difference across the capacitor Cst may be stored.

In the third interval p3, the anode of the light-emitting element ED is initialized. The seventh transistor T7 is turned on by a low-level j-th second scan signal GWj supplied through the j-th second scan line GWLj. If the light-emitting element ED emits light even when a minimum current of the first transistor T1 displaying a black image flows as a driving current, the black image may not be properly displayed. Therefore, the seventh transistor T7 is configured to divert a portion of the minimum current of the first transistor T1 as a bypass current Ibp to an alternative current path, bypassing the current path to the organic light-emitting diode. The light-emitting current led of the light-emitting element ED, reduced by the amount of the bypass current Ibp from the driving current Id, is minimized to a level that ensures accurate black image display, thereby enhancing the contrast ratio.

In the fourth interval p4, the light-emitting element ED emits light based on the programmed data signal Di. The emission control signal EMj supplied from the emission control line EMLj changes from a high level to a low level. The fifth and sixth transistors T5 and T6 are turned on according to the low-level emission control signal EMj. Accordingly, a driving current Id, corresponding to the voltage difference between the voltage of the gate electrode of the first transistor T1 and the first driving voltage ELVDD, is generated and supplied to the light-emitting element ED through the sixth transistor T6, allowing the light-emitting current led to flow through the light-emitting element ED.

Figure 7:
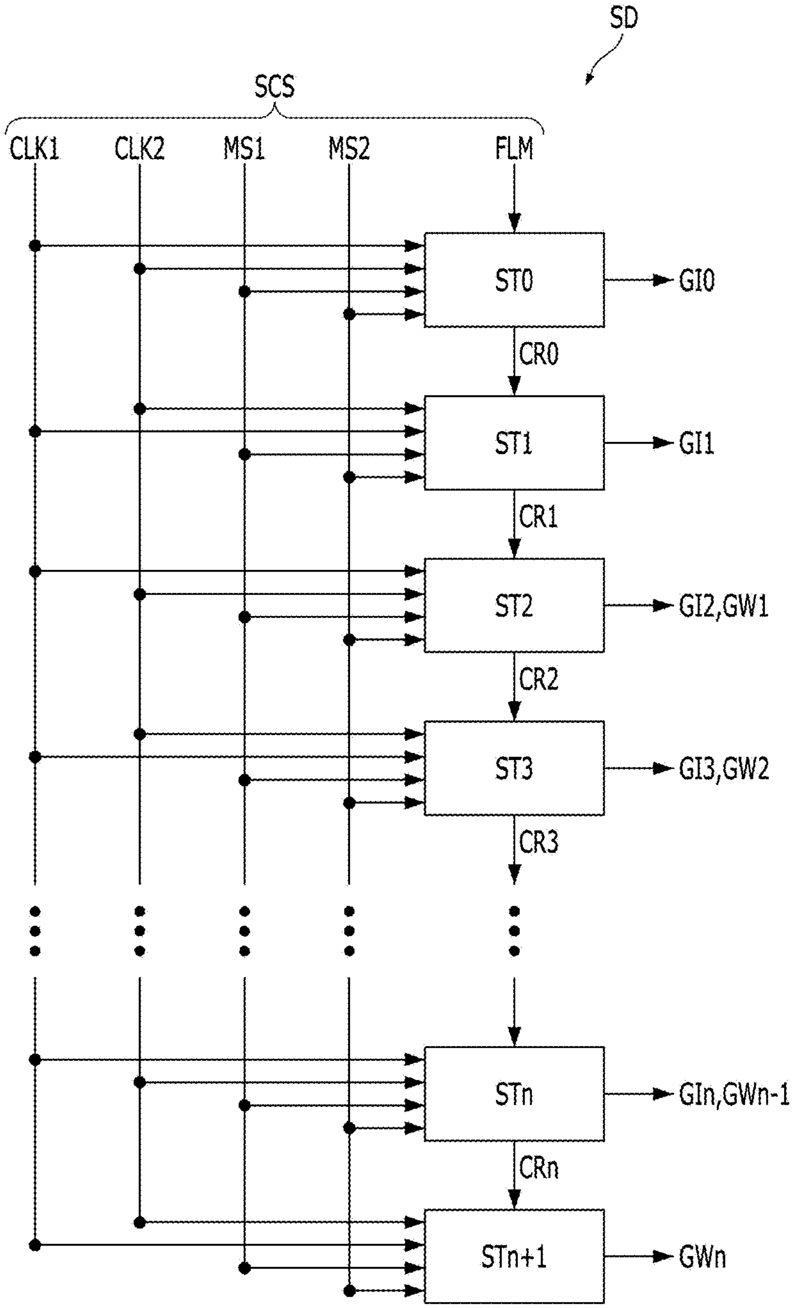
FIG. 7 is an exemplary block diagram of a scan driving circuit shown in FIG. 4.

FIG. 7 is an exemplary block diagram of the scan driving circuit SD shown in FIG. 4.

Referring to FIG. 7, the scan driving circuit SD includes a plurality of driving stages ST0-STn+1, where n is a positive integer. The scan driving circuit SD is configured to receive a scan control signal SCS from the driving controller 100 shown in FIG. 4. The scan control signal SCS may include clock signals CLK1, CLK2, masking signals MS1, MS2, and a start signal FLM. The scan driving circuit SD may be configured to further receive a driving voltage from a voltage generator or the driving controller 100 shown in FIG. 4.

The driving stages ST0-STn+1 may be configured to output first scan signals GI0-GIn and second scan signals GW1-GWn. The first scan signals GI0-GIn may be provided to the first scan lines GIL0-GILn shown in FIG. 4, and the second scan signals GW1-GWn may be provided to the second scan lines GWL1-GWLn shown in FIG. 4.

An initial driving stage ST0 may be configured to receive the start signal FLM as a carry signal. The start signal FLM may be understood as a signal indicating the start of a frame. Each of the driving stages ST1-STn+1 has a dependent connection relationship that receives carry signals CR0-CRn output from the previous driving stage. For example, the driving stage ST1 may receive the carry signal CR0 output from the previous driving stage ST0.

In a general operation, the carry signals CR0-CRn output, respectively, by the driving stages ST0-STn+1 may be identical to the scan signals. However, according to embodiments, unlike the scan signals, each of the driving stages ST0-STn+1 does not output carry signals to the subsequent driving stage, based on the masking signals MS1, MS2.

The masking signals MS1, MS2 may be signals configured to mask the scan signals output from certain driving stages among the driving stages ST0-STn+1 to a predetermined level. For example, the masking signals MS1, MS2 may have a changed level when the scan in the second display area DA2 ends, in order to deactivate the first display area DA1 shown in FIG. 4. A first masking signal MS1 and a second masking signal MS2 may have opposite phases.

The clock signals CLK1, CLK2 may be used to control the output timing of the first scan signals GI0-GIn, the second scan signals GW1-GWn, and the carry signals CR0-CRn that are output by each of the driving stages ST0-STn+1. The first clock signal CLK1 and the second clock signal CLK2 may have opposite phases. The terminals receiving the first clock signal CLK1 in odd-numbered driving stages may correspond to the terminals receiving the second clock signal CLK2 in even-numbered driving stages. Similarly, the terminals receiving the second clock signal CLK2 in odd-numbered driving stages may correspond to the terminals receiving the first clock signal CLK1 in even-numbered driving stages.

Figure 8:
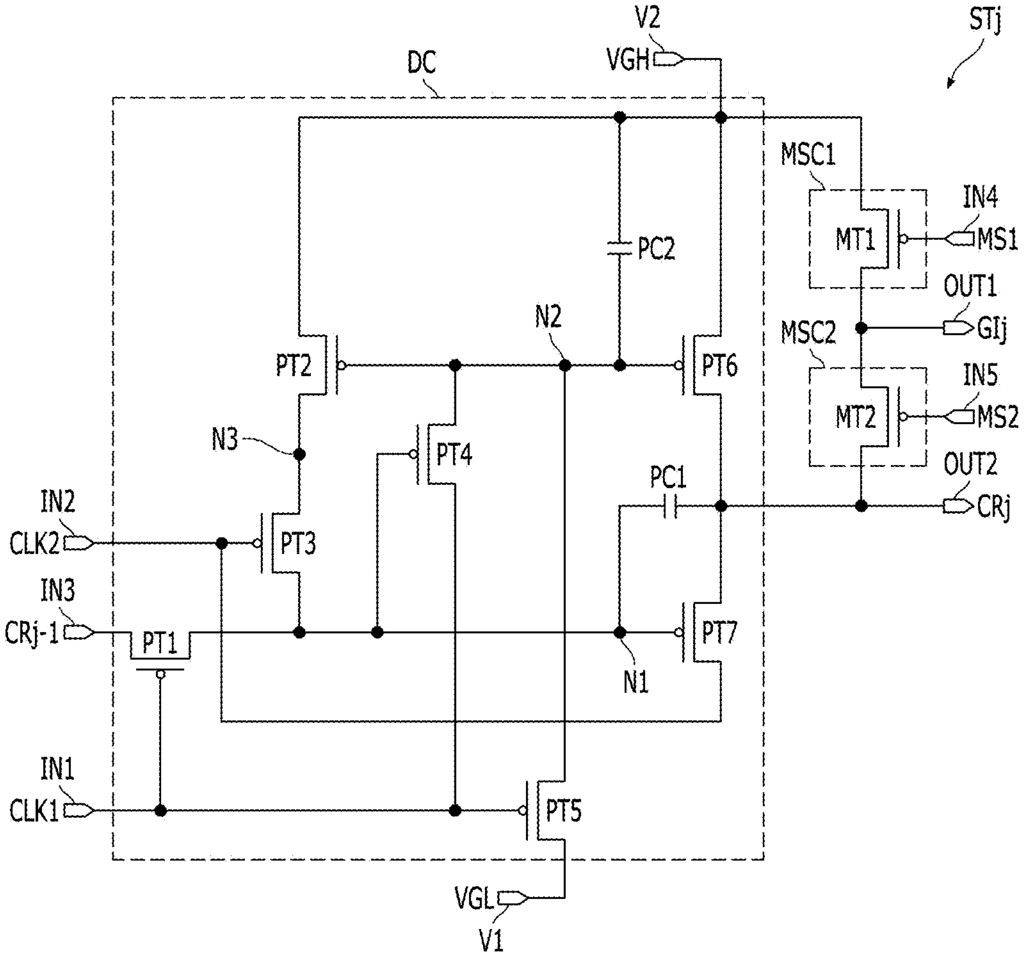
FIG. 8 is an exemplary equivalent circuit diagram of a driving stage shown in FIG. 7.

FIG. 8 is an exemplary equivalent circuit diagram of a driving stage shown in FIG. 7.

Referring to FIG. 8, the driving stage STj corresponds to the j-th driving stage in FIG. 7, and each of the driving stages ST0-STn+1 in FIG. 7 may have the same circuit configuration as the driving stage STj shown in FIG. 8. The driving stage STj includes a driving circuit DC, masking circuits MSC1, MSC2, first to fifth input terminals IN1-IN5, first and second voltage terminals V1, V2, and first and second output terminals OUT1, OUT2. The masking circuit may include a first masking circuit MSC1 and a second masking circuit MSC2.

The driving circuit DC includes transistors PT1-PT7 and capacitors PC1, PC2. The driving circuit DC is configured to receive a first clock signal CLK1, a second clock signal CLK2, and a carry signal CRj−1 through the first to third input terminals IN1-IN3. The driving circuit DC is also configured to receive a first voltage VGL and a second voltage VGH through a first voltage terminal V1 and a second voltage terminal V2. The first voltage VGL and the second voltage VGH may be received from a voltage generator or from the driving controller 100 shown in FIG. 4.

The driving circuit DC is configured to output a scan signal GIj and a carry signal CRj through the first and second output terminals OUT1, OUT2. The carry signal CRj may be provided to the next driving stage STj+1. The carry signal CRj−1 received through a first input terminal IN1 may be output from the previous driving stage STj−1 shown in FIG. 7. The carry signal CRj−1 of the initial driving stage ST0 may be the start signal FLM.

The first input terminal IN1 of each of driving stage of some of the driving stages ST0-STn+1 shown in FIG. 7 (e.g., odd-numbered driving stages) may be configured to receive the first clock signal CLK1, and a second input terminal IN2 may be configured to receive the second clock signal CLK2. Moreover, the first input terminal IN1 of each of the other driving stages (e.g., even-numbered driving stages) of the driving stages ST0-STn+1 may be configured to receive the second clock signal CLK2, and the second input terminal IN2 may be configured to receive the first clock signal CLK1.

A first transistor PT1 includes a first electrode connected to the first input terminal IN1, a second electrode connected to a first node N1, and a gate electrode connected to the first input terminal IN1. The first transistor PT1 is configured to transfer the carry signal CRj−1 to the first node N1 based on the first clock signal CLK1 received from the first input terminal IN1.

A second transistor PT2 includes a first electrode connected to the second voltage terminal V2, a second electrode connected to a third node N3, and a gate electrode connected to a second node N2.

A third transistor PT3 includes a first electrode connected to the third node N3, a second electrode connected to the first node N1, and a gate electrode connected to the second input terminal IN2. The second transistor PT2 and the third transistor PT3 may be configured to lower the level of the first node N1 based on the second clock signal CLK2 received from the second input terminal IN2.

A fourth transistor PT4 includes a first electrode connected to the second node N2, a second electrode connected to the first input terminal IN1, and a gate electrode connected to the first node N1. The fourth transistor PT4 may be configured to increase the level of the second node N2 at a rising edge of the first clock signal CLK1.

A fifth transistor PT5 includes a first electrode connected to the second node N2, a second electrode connected to the first voltage terminal V1, and a gate electrode connected to the first input terminal IN1. The fifth transistor PT5 may be configured to initialize the second node N2 based on the first clock signal CLK1.

A sixth transistor PT6 includes a first electrode connected to the second voltage terminal V2, a second electrode connected to a second output terminal OUT2, and a gate electrode connected to the second node N2. The sixth transistor PT6 may be configured to output the second voltage VGH as a scan signal GIj or a carry signal CRj.

A seventh transistor PT7 includes a first electrode connected to the second output terminal OUT2, a second electrode connected to the second input terminal IN2, and a gate electrode connected to the first node N1. The seventh transistor PT7 may be configured to output the first voltage VGL as a scan signal GIj or a carry signal CRj. The seventh transistor PT7 may be configured to transfer the level of the clock signal input to the second input terminal IN2 to the second output terminal OUT2 based on the voltage level at the first node N1.

A first capacitor PC1 is connected between the first node N1 and the second output terminal OUT2. A second capacitor PC2 is connected between the second voltage terminal V2 and the second node N2.

The first masking circuit MSC1 includes a first masking transistor MT1. The first masking circuit MSC1 is configured to stop (or mask) the output of the scan signal GIj in response to the first masking signal MS1 received through a fourth input terminal IN4. The first masking transistor MT1 includes a gate electrode connected between the first voltage terminal V1 and a first output terminal OUT1 and connected to the fourth input terminal IN4.

The second masking circuit MSC2 includes a second masking transistor MT2. The second masking transistor MT2 is connected between the first output terminal OUT1 and the second output terminal OUT2 and includes a gate electrode connected to a fifth input terminal IN5. The second masking circuit MSC2 is configured to output the carry signal CRj, which is the same as the scan signal GIj, in response to the second masking signal MS2 received through the fifth input terminal IN5.

Figure 9:
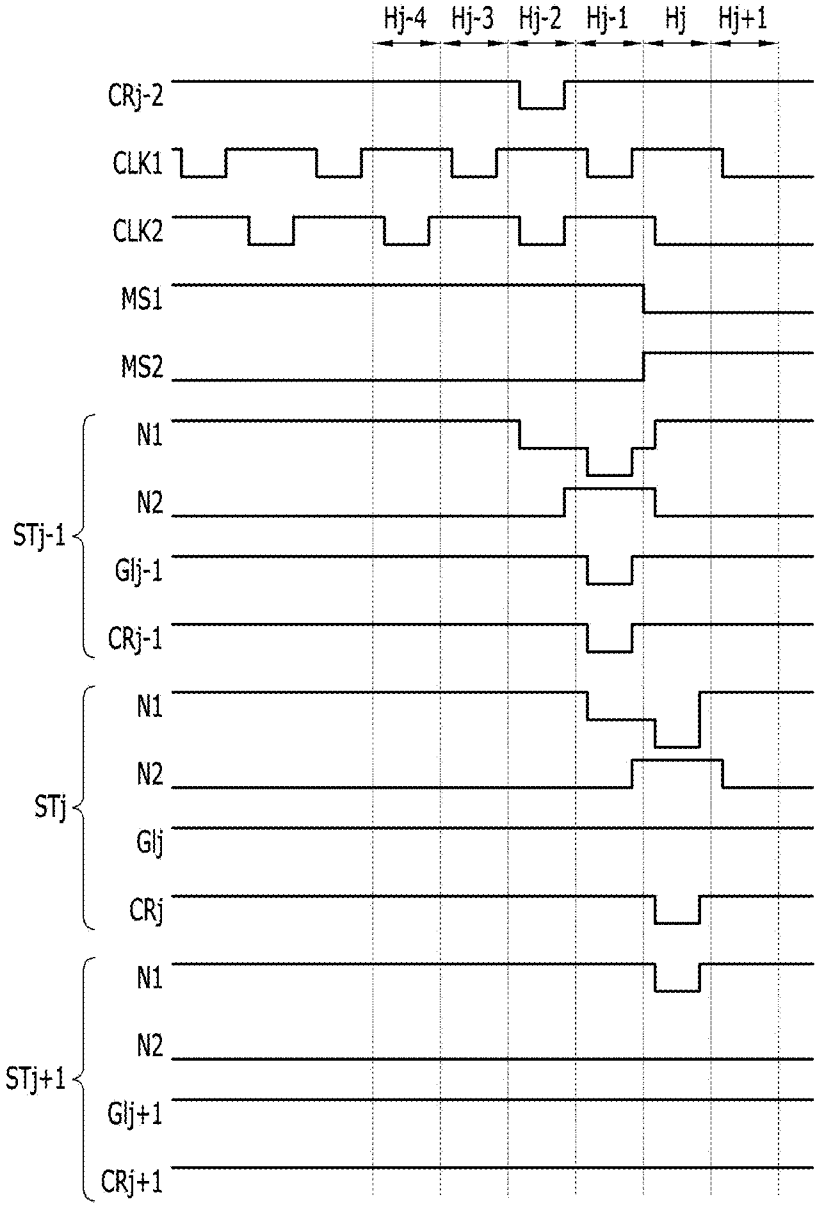
FIG. 9 is a timing diagram illustrating the operation of the driving stage shown in FIG. 8.

FIG. 9 is a timing diagram that illustrates the operation of the driving stage shown in FIG. 8.

Referring to FIG. 9, the operations of the (j−1)-th driving stage STj−1, the j-th driving stage STj, and the (j+1)-th driving stage STj+1 of the scan driving circuit SD are illustrated. For convenience of explanation, FIG. 9 is described using the same reference numerals as those in FIGS. 7 and 8.

The first clock signal CLK1 and the second clock signal CLK2 are signals that have the same frequency and transition to an active level (e.g., low level) at different horizontal intervals H. The horizontal interval H is the time during which the pixels PX within a row of the display panel DP shown in FIG. 4 are driven.

When the first masking signal MS1 is at a second level (e.g., high level), the first masking transistor MT1 is turned off so that the second voltage terminal V2 and the first output terminal OUT1 maintain the electrically separated state.

When the second masking signal MS2 is at a first level (e.g., low level), the second masking transistor MT2 is turned on so that the first output terminal OUT1 and the second output terminal OUT2 maintain the electrically connected state.

The (j−1)-th driving stage STj−1 receives the second clock signal CLK2 at the first input terminal IN1 and the first clock signal CLK1 at the second input terminal IN2.

In the (j−2)-th horizontal interval Hj−2, if the second clock signal CLK2 received at the first input terminal IN1 is at a low level, the first transistor PT1 is turned on. As the first transistor PT1 is turned on, the low-level carry signal CRj−2 is transferred to the first node N1 through the first transistor PT1. When the first node N1 is at a low level, the fifth transistor PT5 is turned on, discharging the second node N2 to the first voltage VGL. When the second node N2 is at a low level, the transistor PT6 is turned on so that the second output terminal OUT2 outputs a high-level carry signal CRj−1. When the first node N1 is at a low level, the seventh transistor PT7 is turned on so that the second output terminal OUT2 is maintained at a high level by the first clock signal CLK1 received at the second input terminal IN2.

In the (j−1)-th horizontal interval Hj−1, if the second clock signal CLK2 is at a high level, the fifth transistor PT5 is turned off, the second node N2 is raised to a high level by the turned-on fourth transistor PT4, and the sixth transistor PT6 is turned off. If the first clock signal CLK1 received at the second input terminal IN2 is at a low level, the first node N1 changes to an even lower level due to the first capacitor PC1, and the seventh transistor PT7 is turned on, allowing the second output terminal OUT2 to output a low-level carry signal CRj−1. Since the second masking transistor MT2 is turned on by the low-level second masking signal MS2, the scan signal GIj−1 is also activated to a low level.

The j-th driving stage STj receives the first clock signal CLK1 at the first input terminal IN1 and the second clock signal CLK2 at the second input terminal IN2. In the j-th horizontal interval Hj, if the first masking signal MS1 transitions from a high level to a low level, and the second masking signal MS2 transitions from a low level to a high level, the first masking transistor MT1 in the first masking circuit MSC1 is turned on, and the second masking transistor MT2 in the second masking circuit MSC2 is turned off.

In the (j−1)-th horizontal interval Hj−1, if the first clock signal CLK1 is at a low level, the first transistor PT1 is turned on. As the first transistor PT1 is turned on, the low-level carry signal CRj−1 is transferred to the first node N1 through the first transistor PT1. When the first node N1 is at a low level, the fifth transistor PT5 is turned on so that the second node N2 is discharged to the first voltage VGL. When the second node N2 is at a low level, the sixth transistor PT6 is turned on so that the second output terminal OUT2 outputs a high-level carry signal CRj. Additionally, when the first node N1 is at a low level, the seventh transistor PT7 is turned on so that the second output terminal OUT2 is maintained at a high level by the second clock signal CLK2 received at the second input terminal IN2.

In the j-th horizontal interval Hj, if the first clock signal CLK1 is at a high level, the fifth transistor PT5 is turned off, and the second node N2 is raised to a high level by the turned-on fourth transistor PT4, causing the sixth transistor PT6 to turn off. If the second clock signal CLK2 received at the second input terminal IN2 is at a low level, the first node N1 changes to an even lower low level by the first capacitor PC1, and the seventh transistor PT7 is turned on, allowing the second output terminal OUT2 to output a low-level carry signal CRj. Here, since the second masking transistor MT2 is turned off by the high-level second masking signal MS2, and the first masking transistor MT1 is turned on by the low-level first masking signal MS1, the scan signal GIj remains at a high level. That is, the j-th driving stage STj can output a high-level scan signal GIj and a low-level carry signal CRj in the j-th horizontal interval Hj.

The (j+1)-th driving stage STj+1 receives the second clock signal CLK2 at the first input terminal IN1 and the first clock signal CLK1 at the second input terminal IN2. In the j-th horizontal interval Hj, if the second clock signal CLK2 received at the first input terminal IN1 is at a low level, the first transistor PT1 is turned on. As the first transistor PT1 turns on, the high-level carry signal CRj is transferred to the first node N1 through the first transistor PT1. When the first node N1 is at a high level, the third, fourth, and seventh transistors PT3, PT4, PT7 remain turned off.

In the (j+1)-th horizontal interval Hj+1, if the second clock signal CLK2 is at a low level, the fifth transistor PT5 is turned on. The turned-on fifth transistor PT5 maintains the second node N2 at a low level, and the sixth transistor PT6 is turned on, allowing a high-level carry signal CRj+1 to be output. Meanwhile, since the first masking transistor MT1 is turned on by the low-level first masking signal MS1, the scan signal GIj+1 remains at a high level. That is, the (j+1)-th driving stage STj+1 outputs a high-level carry signal CRj+1 and a high-level scan signal GIj+1.

The second display area DA2 shown in FIG. 4 includes the pixels PX of the first to (a−1)-th rows, and the first display area DA1 includes the pixels PX of the a-th to n-th rows, where each of and n is a positive integer. In such a case, by changing the first masking signal MS1 from a high level to a low level and changing the second masking signal MS2 from a low level to a high level in the a-th horizontal interval, the scan signal GIa can be masked at a high level. Thereafter, by maintaining the first clock signal CLK1 and the second clock signal CLK2 at a low level, the (a+1)-th scan signal GIa+1 can be maintained at a high level.

The pixels in the a-th row shown in FIG. 4 are connected to the (a−1)-th first scan line GILa−1, the a-th first scan line GILa, and the a-th second scan line SWLa. When the a-th first scan signal GIa, provided to the pixels of the a-th row corresponding to the first display area DA1, is masked at a high level, the (a−1)-th second scan signal GWa−1 is output normally to ensure that the pixels in the (a−1)-th row corresponding to the second display area DA2 correctly display the image.

Figure 10:
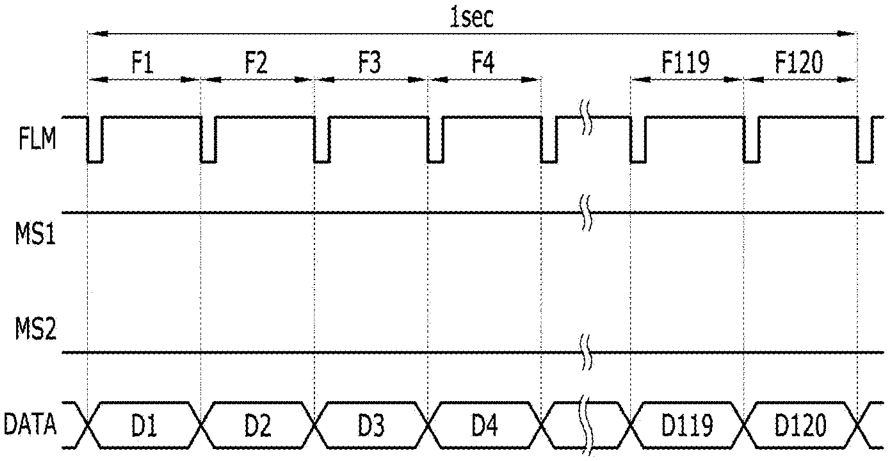
FIG. 10 is a timing diagram illustrating scan control signals and image data signals provided by a driving controller shown in FIG. 4 in a first operation mode.

FIG. 10 is a timing diagram illustrating the scan control signals and image data signals provided by the driving controller 100 shown in FIG. 4 in the first operation mode.

The first operation mode shall be understood as the normal operation mode, in which images are displayed on both the first display area DA1 and the second display area DA2, as in the unfolded state of the display device DD shown in FIG. 1A. For convenience of explanation, FIG. 10 is described using the same reference numerals as those in FIG. 4.

The driving controller 100 is configured to provide a scan control signal SDS to the scan driving circuit SD. Referring to FIG. 10, the start signal FLM, the first masking signal MS1, and the second masking signal MS2, which are included in the scan control signal SDS, are shown. In the first operation mode, the start signal FLM is activated to a low level 120 times per second. That is, the start signal FLM is activated to a low level for each frame, from the first frame F1 to the 120th frame F120. In such a case, the driving frequency of the first display area DA1 and the second display area DA2 may be understood to be 120 Hz. During the first operation mode, the first masking signal MS1 is maintained at a high level, and the second masking signal MS2 is maintained at a low level. Therefore, the first display area DA1 and the second display area DA2 may be activated for each frame.

The driving controller 100 may be configured to sequentially provide an image data signal DATA, which includes a first image data signal D1 corresponding to the first frame F1 through a 120th image data signal D120 corresponding to the 120th frame F120, to the data driving circuit 200. The image data signal corresponding to each frame may be converted by the data driving circuit 200 into data signals and then output to the pixels PX corresponding to the first display area DA1 and the second display area DA2.

Figure 11:
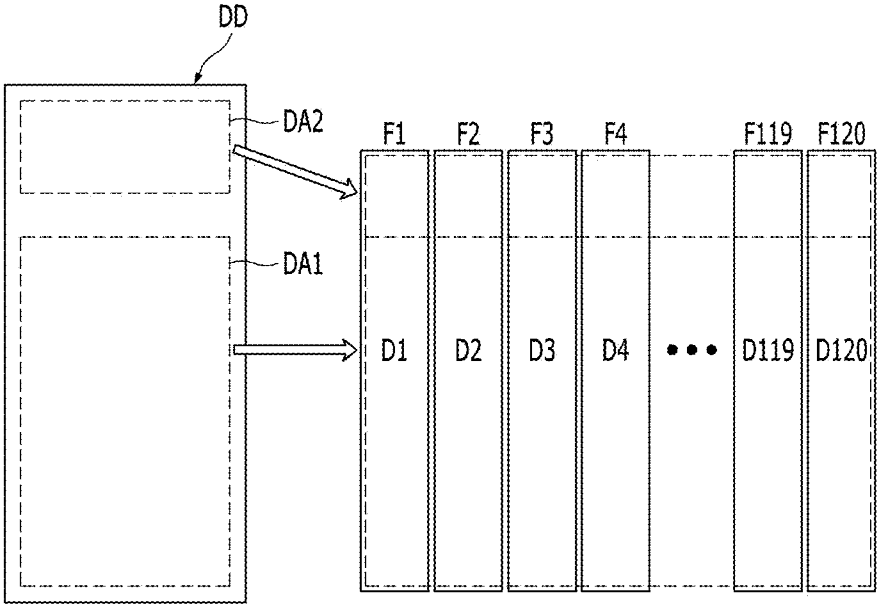
FIG. 11 is a diagram for describing data signal output of the display device shown in FIG. 4 according to the first operation mode.

FIG. 11 is a diagram for describing data signal output of the display device DD shown in FIG. 4 according to the first operation mode.

Referring to FIG. 11, in the first operation mode, the display device DD displays images in the first display area DA1 and the second display area DA2. The display device DD, the first display area DA1, and the second display area DA2 shown in FIG. 11 correspond to the display device DD, the first display area DA1, and the second display area DA2 shown in FIGS. 1A, 1B, and 4.

In the first operation mode, the display device DD may be configured to display images in the first display area DA1 and the second display area DA2 for each frame, from the first frame F1 to the 120th frame F120, based on the first to 120th image data signals D1-D120. Since the first operation mode does not use separate masking signals to suspend the operation of a specific display area, the first display area DA1 and the second display area DA2 may be activated for each frame.

Figure 12:
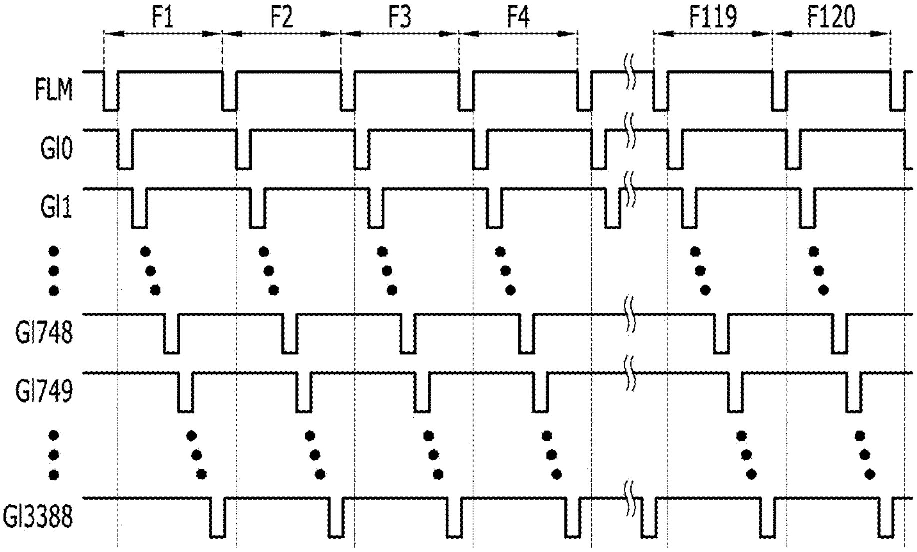
FIG. 12 is a timing diagram illustrating scan signals output by a scan driving circuit shown in FIG. 4 in the first operation mode.

FIG. 12 is a timing diagram illustrating scan signals output from the scan driving circuit shown in FIG. 4 in the first operation mode.

Referring to FIG. 12, the start signal FLM and the first scan signals GI0-GI3388 are shown. As an example, it shall be understood that the second display area DA2 includes the pixels up to the 748th row and that the first display area DA1 includes the pixels from the 749th row to the 3388th row. For convenience of explanation, FIG. 12 is described using the same reference numerals as those in FIG. 4.

In the first operation mode, the first display area DA1 and the second display area DA2 may display images for each of the first to the 120th frames F1-F120. In response to the start signal FLM, the scan driving circuit SD may be configured to sequentially output each of the first scan signals GI0-GI3388 to the first scan lines GIL0-GILn shown in FIG. 4. At the time when the first scan signals GI0-GI3388 have a low level, the pixels receiving the low-level first scan signal via the first scan lines GIL0-GILn may be activated to receive data signals through the data lines. Since the first operation mode does not use separate masking signals to suspend the operation of a specific display area, the first display area DA1 and the second display area DA2 may be activated for each frame.

Figure 13:
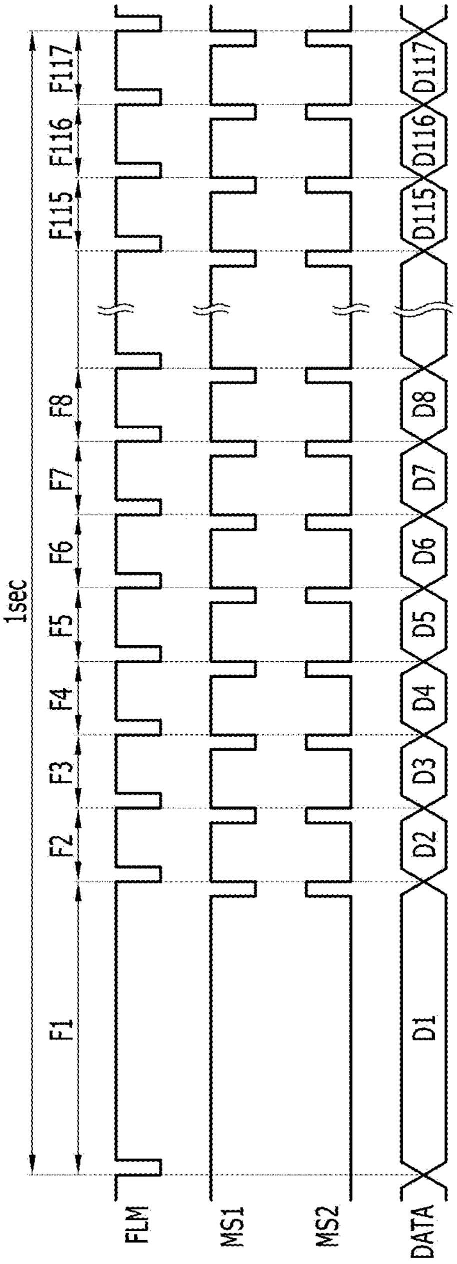
FIG. 13 is a timing diagram illustrating scan control signals and image data signals provided by a driving controller shown in FIG. 4 in a second operation mode.

FIG. 13 is a timing diagram illustrating the scan control signals and the image data signals provided by the driving controller shown in FIG. 4 in the second operation mode. The second operation mode may be understood as a partial operation mode, focusing on displaying images in the second display area DA2, as in the folded state of the display device DD shown in FIG. 1B. However, the second operation mode is not limited to the folded state and may be, for example, an operation mode according to various environments or settings utilizing the operation of specific display areas. For convenience of explanation, FIG. 13 is described using the same reference numerals as those in FIG. 4.

Referring to FIG. 13, the driving controller 100 is configured to provide the scan control signal SDS, which includes the start signal FLM, the first masking signal MS1, and the second masking signal MS2, to the scan driving circuit SD. Referring to FIG. 13, as the initial start signal FLM is activated to a low level in the second operation mode, the driving controller 100 is configured to output the first image data signal D1 corresponding to the first frame F1 to the data driving circuit 200. During the first frame F1, the first display area DA1 and the second display area DA2 may be activated to output images. For example, the first display area DA1 may display, but is not limited to, a black image. The first display area DA1 may also display, for example, a still image. A section corresponding to the first frame F1 may be the same as a frame section distinguished by a vertical synchronization signal included in the control signal CTRL provided to the driving controller 100.

Subsequently, the driving controller 100 may be configured to output the second image data signal D2 corresponding to the second frame F2 to the data driving circuit 200. While the scan driving circuit SD scans some of the pixels PX in response to the low-level-activated start signal FLM, the first masking signal MS1 may transition to a low level, and the second masking signal MS2 may transition to a high level. For example, the first masking signal MS1 and the second masking signal MS2 may transition at the time when the scanning of the second display area DA2 is complete. As a result, the scan driving circuit SD may be configured to stop scanning the first display area DA1. The second image data signal D2 may correspond to the image corresponding to the second display area DA2.

The driving controller 100 may be configured to output a low-level start signal FLM to the scan driving circuit SD and output the third image data signal D3 corresponding to the third frame F3 to the data driving circuit 200, after stopping the scan pursuant to masking. As with the second frame F2, while scanning some of the pixels PX in response to the start signal FLM, the first masking signal MS1 may transition to a low level, and the second masking signal MS2 may transition to a high level. The second frame F2 and the third frame F3 may output images corresponding to the second display area DA2 for the same duration. This operation may be repeated in the fourth frame F4 and the fifth frame F5. That is, in the second operation mode, the start signal FLM may indicate the start of each of the plurality of sub-frames.

The section corresponding to each of the second through fifth frames F2-F5 may be shorter than the section of the first frame F1 and shorter than the frame interval distinguished by the above-mentioned vertical synchronization signal. Moreover, the second through fifth image data signals D2-D5 may all correspond to images displayed in the second display area DA2. In an example, the first display area DA1 may be three times the size of the second display area DA2. In such a case, the sum of time for driving the second to fifth frames F2-F5 may be equal to the driving time of the first frame F1 and correspond to the frame section distinguished by the vertical synchronization signal. That is, each of the second to fifth frames F2-F5 may be understood as sub-frames that divide the frame section defined by the vertical synchronization signal into four parts.

The driving controller 100 may be configured to control the scan driving circuit SD and the data driving circuit 200 to divide the frame section into a plurality of sub-frames and to display images in the second display area DA2 in the second operation mode. If the scan rate in the second operation mode is the same as the scan rate in the first operation mode, the driving frequency of the second display area DA2 in the second operation mode would be four times that of the first operation mode.

The driving controller 100 may be configured to reduce the operating speed or lower the scan rate in the second operation mode compared to the first operation mode in order to drive the second display area DA2 at the same driving frequency as in the first operation mode. For example, the scan driving circuit SD may be configured to activate the pixels PX in the second operation mode at a scan rate that is one-fourth of the scan rate in the first operation mode. In such a case, the duration of the first frame F1 in FIG. 13 may be four times that of the duration of the first frame F1 in FIG. 10. Moreover, the duration of the second frame F2 in FIG. 13 may be the same as the duration of the second frame F2 in FIG. 10.

The driving controller 100 may be configured to reduce the frequency of the clock signals CLK1, CLK2 output to the scan driving circuit SD in order to lower the scan rate in the second operation mode compared to the first operation mode. For example, the driving controller 100 may be configured to generate the clock signals CLK1, CLK2 in the second operation mode with a frequency one-fourth of the frequency of the clock signals in the first operation mode. As a result, the scan rate may decrease in proportion to the frequency reduction of the clock signal in the second operation mode compared to the first operation mode. Moreover, in the second operation mode, the pulse width of signals output from the driving controller 100, such as the start signal FLM and the masking signals MS1, MS2, may increase relative to their pulse width in the first operation mode.

By implementing the second operation mode, the display device DD can reduce power consumption by limiting unnecessary driving of the first display area DA1 through masking. Furthermore, as the driving controller 100 reduces the frequency of the clock signals CLK1, CLK2 in the second operation mode, overall power consumption of the display device DD can be further reduced. Despite the reduction of the full-frame driving frequency from 120 Hz to 30 Hz, the driving frequency of the second display area DA2 remains unchanged between the first and second operation modes. As a result, display performance for the active display area can be maintained without degradation.

Still referring to FIG. 13, the driving controller 100 may be configured to drive the second display area DA2 up to the 117th frame F117, by lowering the clock speed fourfold in the second operation mode. This provides similar performance to driving the second display area DA2 up to the 120th frame F120 in the first operation mode shown in FIG. 10. The second through 117th image data signals D2-D117 correspond to image data signals for the second display area DA2. The driving controller 100 may be configured to cut the received image signals RGB to correspond to each of the sub-frames, to operate in the second operation mode. For example, the driving controller 100 may be configured to discard the image data signals corresponding to the first display area DA1 and process the image data signals corresponding to the second display area DA2 for continuous output. In an embodiment, this image processing may also be performed by an application processor and reflected in the image signal RGB. In such a case, the power consumption of the application processor and the interface may also be reduced.

After the 117th frame F117, the first display area DA1 and the second display area DA2 may be activated, as in the first frame F1. In such a case, the first display area DA1 may have a driving frequency of about 1 Hz. However, the present disclosure is not limited thereto, and the first display area DA1 may also be activated after more repetitions of the sub-frames that activate the second display area DA2.

Figure 14:
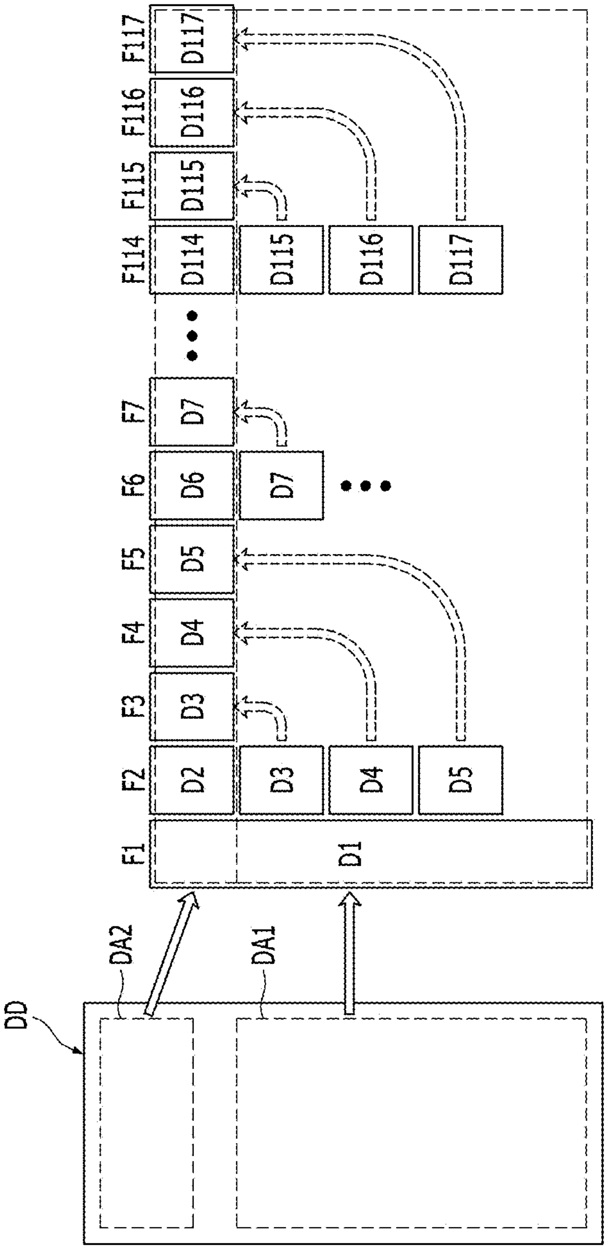
FIG. 14 is a diagram for describing data signal output of the display device shown in FIG. 4 according to the second operation mode.

FIG. 14 is a diagram for describing data signal output of the display device shown in FIG. 4 according to the second operation mode.

Referring to FIG. 14, the display device DD is configured to display images in the first display area DA1 and the second display area DA2 in the second operation mode. The display device DD, the first display area DA1, and the second display area DA2 shown in FIG. 14 correspond to the display device DD, the first display area DA1, and the second display area DA2 shown in FIGS. 1A, 1B, and 4.

In the second operation mode, the display device DD may be configured to display images in the first display area DA1 and the second display area DA2 based on the first image data signal D1 in the first frame F1. Thereafter, the second operation mode stops driving the first display area DA1 through masking. Accordingly, for each frame from the second to the 117th frames F2-F117, the first display area DA1 may be deactivated, and the second display area DA2 may be activated.

For example, in an embodiment, in the second operation mode, the display device DD may initially display images in both the first display area DA1 and the second display area DA2 using the first image data signal D1 in the first frame F1. Following this, the operation may transition to a selective driving approach, where the first display area DA1 is deactivated through masking, allowing only the second display area DA2 to remain active. This masking process may effectively prevent unnecessary power consumption by ensuring that the first display area DA1 does not receive redundant image data when it is not visible or required for display output.

Accordingly, from the second frame F2 to the 117th frame F117, only the second display area DA2 continues to operate, while the first display area DA1 remains inactive. During this period, the system may improve image rendering for the second display area DA2 by adjusting, for example, refresh rates, power distribution, and signal processing parameters to improve efficiency. This selective driving method may enable reduced power consumption, prolong device operation time, and maintain high display performance in scenarios where only a portion of the screen is required to be active. According to embodiments, additional techniques, such as adjusting the driving frequency or dynamically allocating processing resources, may be employed to further improve the display's functionality during the second operation mode.

As described above with reference to FIG. 13, each of the second through fifth frames F2-F5 may be understood as sub-frames that divide the frame section defined by the vertical synchronization signal into four parts. During the operation time of the first frame F1, the second through fifth frames F2-F5 may operate. Moreover, the driving controller 100 may be configured to lower the frequency of the clock signals CLK1 and CLK2 in the second operation mode compared to the first operation mode. As a result, each of the scan times or operation times of the second through fifth frames F2-F5 shown in FIG. 14 may be the same as each of the scan times or operation times of the second through fifth frames F2-F5 shown in FIG. 11.

Figure 15:
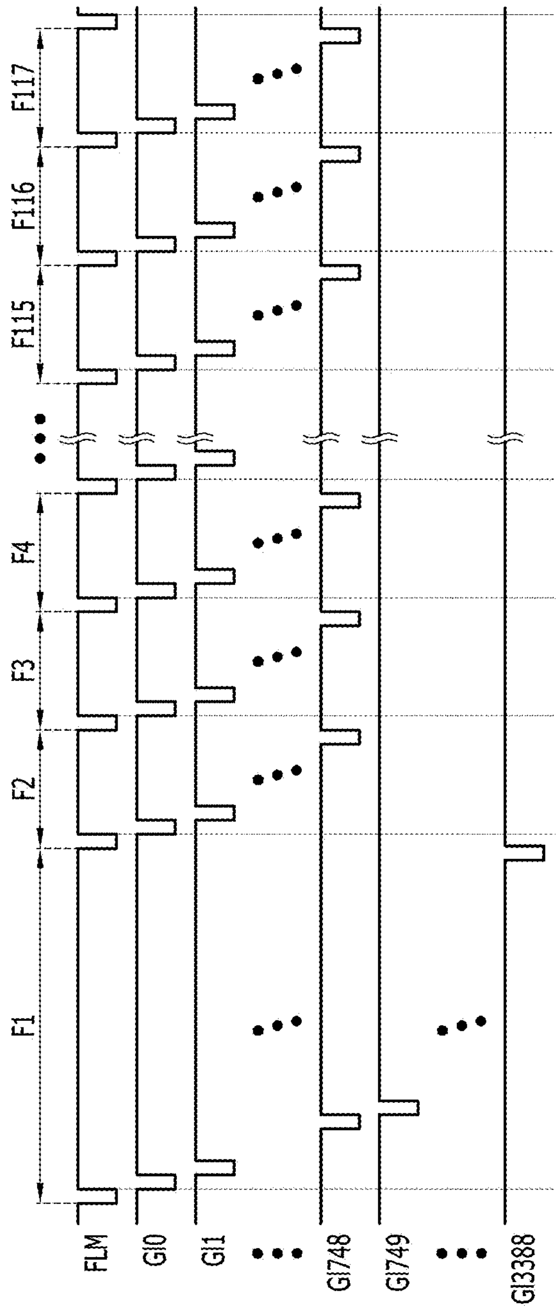
FIG. 15 is a timing diagram illustrating scan signals output from a scan driving circuit shown in FIG. 4 in the second operation mode.

FIG. 15 is a timing diagram illustrating scan signals output from the scan driving circuit shown in FIG. 4 in the second operation mode.

Referring to FIG. 15, the start signal FLM and the first scan signals GI0-GI3388 are depicted. For example, it shall be understood that the second display area DA2 includes the pixels up to the 748th row and that the first display area DA1 includes the pixels from the 749th row to the 3388th row. For convenience of explanation, FIG. 15 is described using the same reference numerals as those in FIG. 4.

In the second operation mode, the first display area DA1 and the second display area DA2 may be sequentially activated in the first frame F1. The scan driving circuit SD may be configured to sequentially output each of the first scan signals GI0-GI3388 to the first scan lines GIL0-GILn shown in FIG. 4, in response to the initial start signal FLM.

In the second through the 117th frames F2-F117, the second display area DA2 may be sequentially activated, but the first display area DA1 may be masked and thus not activated. Accordingly, the scan driving circuit SD may be configured to activate some of the first scan signals GI0-GI3388 corresponding to the second display area DA2 (e.g., GI0-GI748) at a low level. Accordingly, the scan time or driving time for the second through 117th frames F2-F117 may be shorter than that of the first frame F1. Given that the ratio between the first display area DA1 and the second display area DA2 is 2640:748, or about 3.5:1, the scan time or driving time for the first frame F1 may be approximately 3.5 times longer than for the other frames.

The timing diagram in FIG. 15 may be generated based on a clock frequency that is one-fourth of the clock frequency used in FIG. 12. Therefore, the pulse width of the start signal FLM and the first scan signals GI0-GI3388 may be four times the pulse width shown in FIG. 12. The length of the first frame F1 may be four times the length of the first frame F1 shown in FIG. 12, and during the frame section shown in FIG. 12, one of the second through 117th frames F2-F117 may be possibly driven. That is, the frame section in the second operation mode may last longer than the frame section in the first operation mode.

Figure 16:
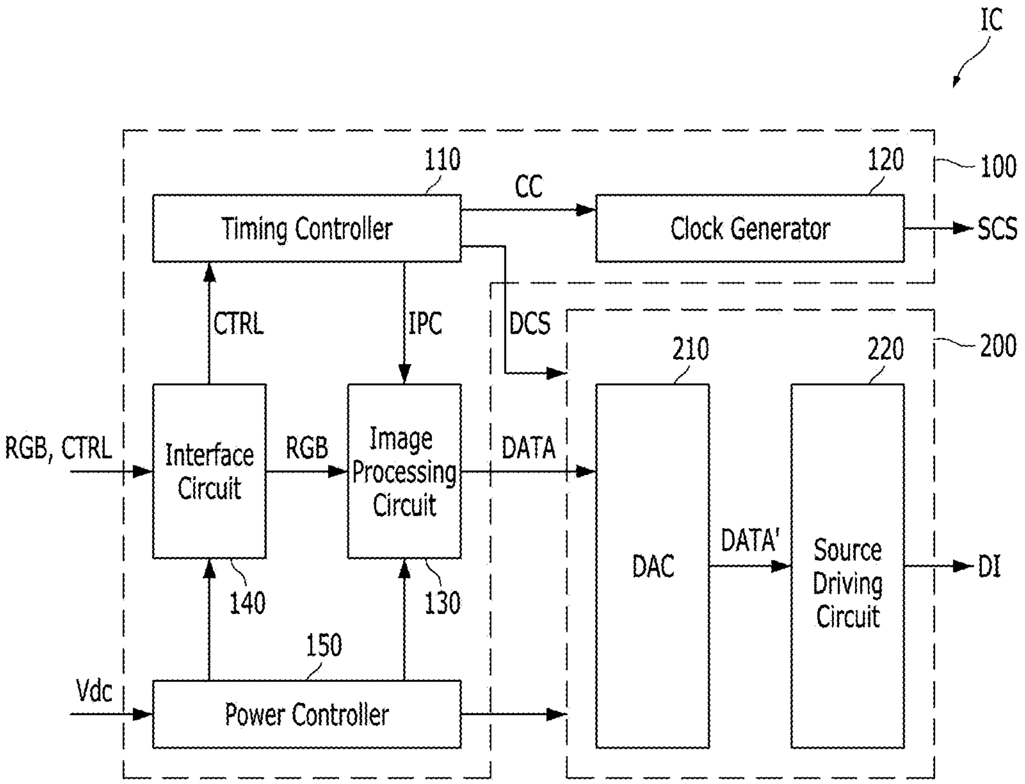
FIG. 16 is an exemplary block diagram of a driving integrated circuit shown in FIG. 4.

FIG. 16 is an exemplary block diagram of the driving integrated circuit shown in FIG. 4.

Referring to FIG. 16, the driving integrated circuit IC includes a driving controller 100 and a data driving circuit 200, corresponding to the driving controller 100 and the data driving circuit 200 shown in FIG. 4. It shall be appreciated that the functional blocks shown in FIG. 16 are illustrative only.

The driving controller 100 may include a timing controller 110, a clock generator 120, an image processing circuit 130, an interface circuit 140, and a power controller 150. The timing controller 110 may be configured to control the timing of elements included in the driving integrated circuit IC. The timing controller 110 may be configured to generate a clock control signal CC, an image processing control signal IPC, and a data control signal DCS based on control signals CTRL and the operation mode of the display device DD.

The clock generator 120 may be configured to generate a scan control signal SCS for driving the display panel DP based on the clock control signal CC. For example, the clock generator 120 may be configured to receive a system clock signal included in the control signal CTRL via the clock control signal CC and convert the system clock signal to clock signals CLK1, CLK2 for operation of the scan driving circuit SD. Moreover, the clock generator 120 may be configured to generate a start signal FLM and a masking signal to be transferred to the scan driving circuit SD based on the clock control signal CC generated by the timing controller 110 according to the operation mode. Alternatively, the start signal FLM or the masking signal may be generated by the timing controller 110.

The clock generator 120 may be configured to generate the scan control signal SCS for activating both the first display area DA1 and the second display area DA2 at a first scan rate in the first operation mode. The clock generator 120 may be configured to generate the scan control signal SCS for activating the second display area DA2 at a second scan rate, which is lower than the first scan rate, in the second operation mode. The scan control signal SCS in the first operation mode may include a clock signal with a first frequency, and the scan control signal SCS in the second operation mode may include a clock signal with a second frequency lower than the first frequency. The clock signal may be output not only to the scan driving circuit SD but also to the data driving circuit 200 for synchronizing data signal output.

The image processing circuit 130 may be configured to process the image signal RGB based on the image processing control signal IPC. The image processing circuit 130 may be configured to perform image enhancement and compensation operations, such as gamma correction on the image signal RGB. Further, the image processing circuit 130 may be configured to process the image signal RGB so that the image data signals corresponding to the second display area DA2 are repeated based on the second operation mode of the display device DD. The image processing circuit 130 be configured to generate an image data signal DATA by converting the data format of the image signal RGB to match the interface specifications of the data driving circuit 200.

The interface circuit 140 may be configured to perform communication with an external device (e.g., an application processor). The interface circuit 140 may be configured to receive the image signal RGB and the control signal CTRL from external sources and transfer the received image signal RGB and control signal CTRL to the timing controller 110 or the image processing circuit 130.

The power controller 150 may be configured to receive a DC voltage Vdc from an external device (e.g., a voltage generator) and to generate and output voltages for use within the driving integrated circuit IC or voltages used in the display panel DP and the scan driving circuit SD. For example, the power controller 150 may be configured to generate initialization voltages VINT1, VINT2 for initializing the pixels PXij shown in FIG. 5, driving voltages for driving the driving controller 100 and the data driving circuit 200, and the first voltage VGL and the second voltage VGH for operating the driving stage STj shown in FIG. 8.

The data driving circuit 200 includes a digital-to-analog conversion circuit 210 and a source driving circuit 220. The digital-to-analog conversion circuit 210 is configured to convert the image data signal DATA generated by the image processing circuit 130 into an analog form. The digital-to-analog conversion circuit 210 may be configured to receive a reference voltage (gamma voltage) from the driving controller 100 and convert the image data signal DATA to an analog form based on the reference voltage.

The source driving circuit 220 may be configured to receive the converted data signal DATA' from the digital-to-analog conversion circuit 210 and output the data signal DI to the pixels PX through the data lines based on the data control signal DCS. The source driving circuit 220 may be configured to receive a clock signal from the clock generator 120 in order to synchronize the data signal DI with the scan operation of the scan driving circuit SD and output the synchronized data signal DI. Accordingly, the time to output the data signal DI in the first operation mode may be shorter than the time to output the data signal DI in the second operation mode.

Figure 17A:
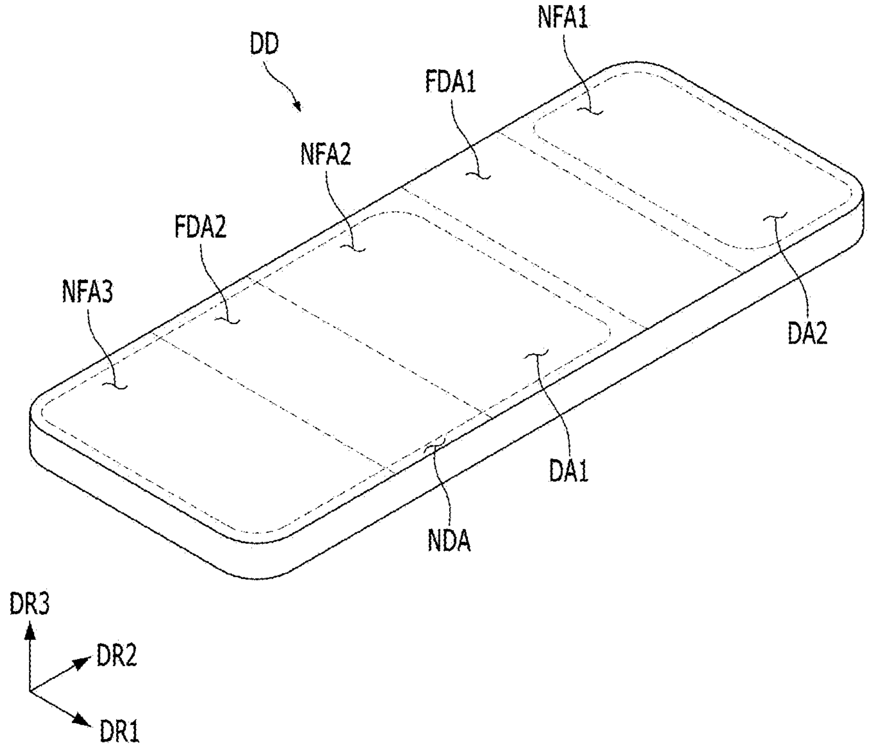
FIGS. 17A and 17B are perspective views of a display device according to an embodiment of the present disclosure.
Figure 17B:
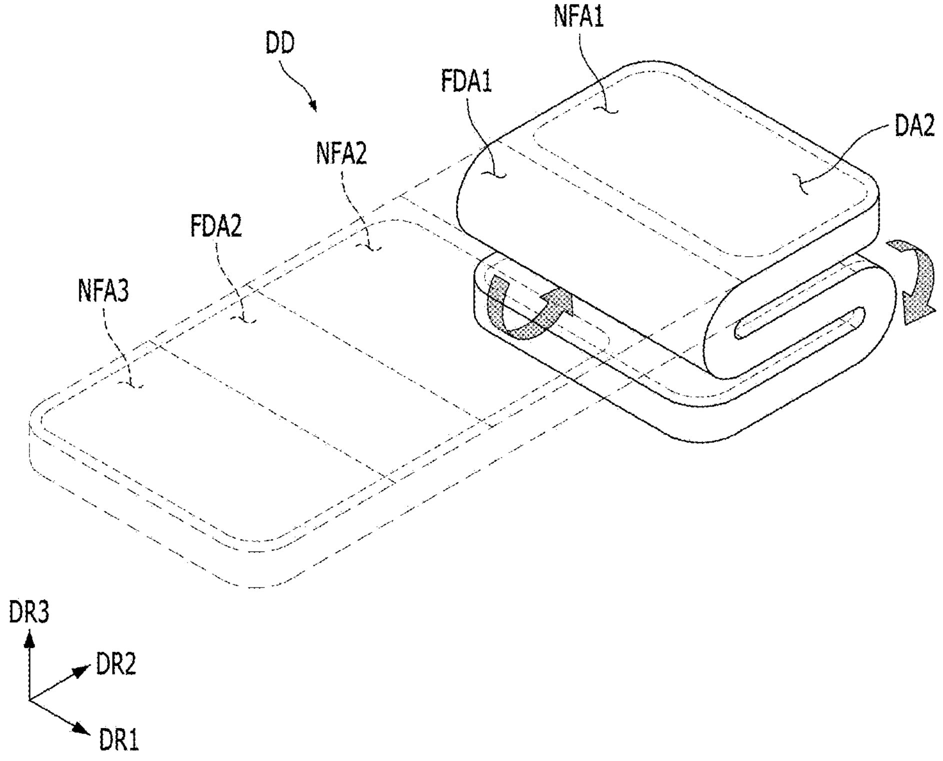

FIGS. 17A and 17B are perspective views of a display device DD according to an embodiment of the present disclosure.

FIG. 17A shows the unfolded state of the display device DD, and FIG. 17B shows the folded state of the display device DD. The display device DD shown in FIG. 17A may display an image based on the first operation mode described above, and the display device DD shown in FIG. 17B may display an image based on the second operation mode described above.

Referring to FIG. 17A, the display device DD includes a first display area DA1, a second display area DA2, and a non-display area NDA. Unlike FIG. 1A, the first display area DA1 and the second display area DA2 do not overlap in a planar view and may instead be formed on the same side, e.g., the front surface. The non-display area NDA is disposed adjacent to (e.g., surrounds) the first display area DA1 and the second display area DA2.

The display device DD may include a plurality of folding areas FA1, FA2 and a plurality of non-folding areas NFA1, NFA2, NFA3. A first folding area FA1 may be disposed between a first non-folding area NFA1 and a second non-folding area NFA2. A second folding area FA2 may be disposed between the second non-folding area NFA2 and a third non-folding area NFA3. The first display area DA1 may overlap in a planar view with the second folding area FA2 and the second and third non-folding areas NFA2, NFA3 in a plan view. The second display area DA2 may overlap the first non-folding area NFA1.

Referring to FIG. 17B, the display device DD may be configured to be folded as the first folding area FA1 and the second folding area FA2 bend. In such a case, the plurality of non-folding areas NFA1, NFA2, NFA3 may face each other along the third direction DR3. When the display device DD is folded, the first folding area FA1 of the display device DD may fold inward, concealing the first display area DA1. When the display device DD is folded, the second folding area FA2 of the display device DD may fold outward so that the second display area DA2 is visible.

In the unfolded state, both the first display area DA1 and the second display area DA2 are visible, similar to their configuration in FIG. 1A, and thus can display an image together. Therefore, it is possible to operate in the first operation mode described above. In the folded state, since the first display area DA1 is not visible, only the second display area DA2 can display an image. Therefore, it is possible to operate in the second operation mode described above.

Figure 18:
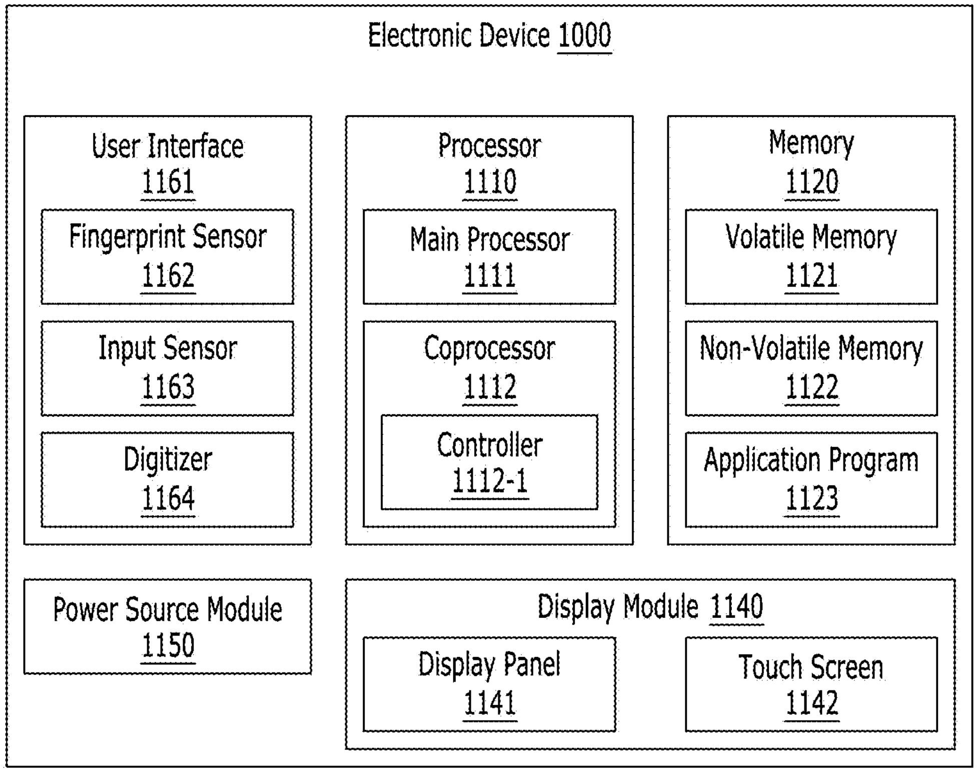
FIG. 18 is a diagram illustrating an electronic device according to an embodiment of the present disclosure.

FIG. 18 is a diagram illustrating an electronic device according to an embodiment of the present disclosure.

Referring to FIG. 18, the electronic device 1000 according to an embodiment of the present disclosure may output various information (e.g., images, text, music, etc.) through a display module 1140, which, for example, may correspond to the display device DD described above. When a processor 1110 executes an application stored in a memory 1120, the display module 1140 may provide application information to a user through a display panel 1141.

In some embodiments, the electronic device 1000 may be configured as, for example, a smartphone, camera, smart TV, monitor, smartwatch, tablet, automotive display, or AR/VR headset. For example, the electronic device 1000 may be a smartphone including a touch-sensitive display area DA for interaction and a non-display area NDA including sensors and circuits for enhanced functionality. For example, the electronic device 1000 may be a television or monitor including a large display area DA for high-resolution video playback and a non-display area NDA incorporating driving circuits or connectivity modules for external inputs. For example, the electronic device 1000 may be a smartwatch including a display area DA optimized for compact and high-clarity visuals and a non-display area NDA integrating biometric sensors for health monitoring. In some cases, the electronic device 1000 be an AR/VR headset.

In some embodiments, memory 1120 may store information such as software codes for operating an application program 1123. The application program 1123 may include software designed to execute specific tasks or provide functionality to a user. The application program 1123 may operate under the control of the processor 1110 and utilizes data stored in the memory 1120 to deliver a wide range of features, such as, for example, productivity tools, multimedia streaming and playback, file or mail deliveries or communication services. The application program 1123 interacts seamlessly with the user interface 1161 or touch screen 1142, allowing a user to launch, navigate, and utilize the program through user inputs such as, for example, touch, tap, gesture, or voice interaction.

Upon user selection of an application via touch screen 1142 or user interface 1161, the processor 1110 may execute the application program 1123 corresponding to the selected application retrieved from the memory 1120 to perform functionalities of the application. For example, when a user selects a camera application by tapping the icon (or a camera application icon) presented on the display panel 1141, the processor 1110 activates a camera module. The processor 1110 may transmit image data corresponding to a captured image acquired through the camera module to the display module 1140. The display module 1140 may display an image corresponding to the captured image through the display panel 1141.

In an embodiment, when a user wishes to make a phone call, the user taps the telephone icon displayed on the display module 1140, and the processor 1110 may execute a phone application program stored in the memory 1120. A telephone keypad may be presented on the display panel 1141 for the user to enter a phone number to call.

In an embodiment, the display module 1140 may be integrated into an electronic device 1000, such as, for example, a laptop computer, smart TV, or tablet. A user wishing to access a multimedia streaming application (e.g., to watch a music video or movie) can do so by tapping the corresponding icon. This action activates the application, allowing the user to view the streamed content.

The processor 1110 may include a main processor 1111 and an auxiliary or coprocessor 1112. The main processor 1111 may include a central processing unit (CPU). The main processor 1111 may further include one or more of a graphics processing unit (GPU), a communication processor (CP), and an image signal processor (ISP).

The coprocessor 1112 may include a controller 1112-1. The controller 1112-1 may include an interface conversion circuit and a timing control circuit. The controller 1112-1 may receive an image signal from the main processor 1111, convert the data format of the image signal to match the interface specifications with the display module 1140, and output image data. The controller 1112-1 may output various control signals to drive the display module 1140. For example, the controller 1112-1 may drive the display module 1140 to display the icon on the display screen suitable for selection by a user to cause execution of an application program 1123.

The memory 1120 may store one or more application programs 1123 and various data used by at least one component (for example, the processor 1110 or the user interface 1161) of the electronic device 1000 and input data or output data for commands related thereto. For example, a camera application program, a GPS application program, an augmented reality and virtual reality application program, and other application programs that can be executed by the processor 1110 upon selection of corresponding icons presented on the display screen (or display panel 1141) via the touch screen 1142 or user interface 1161 by the user. In addition, various setting data corresponding to user settings may be stored in the memory 1120. The memory 1120 may include volatile memory 1121 and non-volatile memory 1122.

The display module 1140 may output visual information (images) to the user. The display module 1140 may include the display panel 1141, a gate driver, the source driver, a voltage generation circuit, and a touch screen 1142. The display module 1140 may further include a window, a chassis, and a bracket to protect the display panel 1141. The display module 1140 may include at least a part of the configuration of the display device DD described above.

The user interface 1161 serves as the interaction medium between a user and the electronic device 1000. The user interface 1161 may detect an input by a part (e.g., finger) of a user's body or an input by a pen or a mouse, and generate an electric signal or data value corresponding to the input. The user interface 1161 includes the fingerprint sensor 1162, the input sensor 1163, and a digitizer 1164.

The fingerprint sensor 1162 may sense a fingerprint for biometric recognition of the user and may also measure one or more biological signals such as, for example, blood pressure, moisture, or body mass.

The input sensor 1163 may sense user interactions including, for example, touch, tap, gesture, motion, spoken command, and eye movement. The input sensor 1163 includes optical sensors for image capture, eye tracking, or motion and gesture detection. Optical sensors may be infrared or semiconductor photodetectors. The input sensor 1163 includes audio and acoustic sensors, which may be MEMS microphones for voice recognition or sound-based interaction. The audio and acoustic sensors can be installed as part of the user interface 1161 or embedded in the display panel 1141.

The digitizer 1164 may generate a data value corresponding to coordinate information of input by a pen or a mouse to control movement of an onscreen cursor. The digitizer 1164 may generate the amount of change in electromagnetic due to the input as the data value. The digitizer may detect an input by a passive pen or transmit and receive data with an active pen or a remote.

At least one of the fingerprint sensor 1162, the input sensor 1163, or the digitizer 1164 may be implemented as a sensor layer formed on the top layer of the display panel 1141 through a continuous process with a process of forming elements (for example, the light emitting element, the transistor, and the like) included in the display panel 1141.

In addition, the user interface 1161 may further include, for example, a gesture sensor, a gyro sensor that senses rotational movements, an acceleration sensor to track translational movement, a grip sensor, a pressure sensor, a proximity sensor, a color sensor, an infrared (IR) emitter and camera sensor for tracking gaze direction and eye movements, a temperature sensor, or a light sensor. For example, the gyro sensor, acceleration sensor, and infrared emitter and camera may be particularly suitable for AR/VR headset functions.

The touch screen 1142 includes touch sensors embedded in semiconductor layers of the display panel 1141 to sense pressure applied to the top layer (screen) of the display panel 1141. The touch sensors can be a capacitive or a resistive type. The touch screen 1142 may serve as the primary interface for the user to select and navigate applications, control, and interact with the electronic device 1000.

The display panel 1141 (or display) may include, for example, a liquid crystal display panel, an organic light emitting display panel, or an inorganic light emitting display panel. However, the type of the display panel 1141 is not particularly limited. The display panel 1141 may be of a rigid type or a flexible type that can be rolled or folded. The display module 1140 may further include a supporter, bracket, heat dissipation member, and the like that support the display panel 1141. The display panel 1141 may include the display device DD described above.

The power source module 1150 may supply power to the components of the electronic device 1000. The power source module 1150 may include a battery that charges the power source voltage. The battery may include a non-rechargeable primary battery or a rechargeable secondary battery or fuel cell. The power source module 1150 may include a power management integrated circuit (PMIC). The PMIC may supply optimized power to each of the components described above including the display module 1140.

Figure 19:
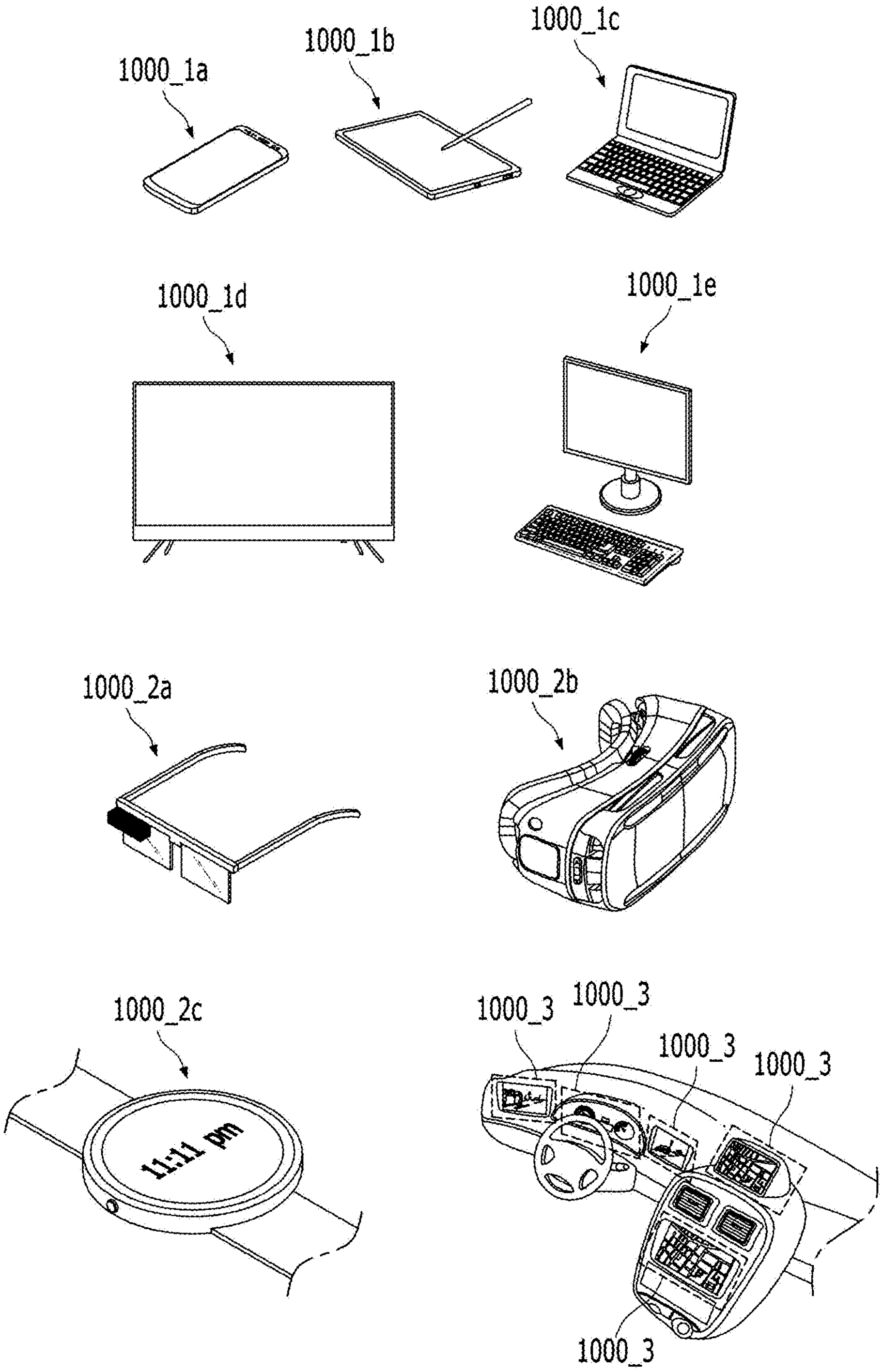
FIG. 19 illustrates schematic diagrams of electronic devices according to one or more embodiments.

FIG. 19 illustrates schematic diagrams of electronic devices according to one or more embodiments.

Referring to FIG. 19, one or more suitable electronic devices having display devices according to one or more embodiments may include not only an image display electronic device, such as a smart phone 1000-1*a*, a tablet PC 1000-1*b*, a laptop 1000-1*c*, a TV 1000-1*d*, and a desk monitor 1000-1*e*, but also a wearable electronic device including a display module, such as a smart glass 1000-2*a*, a head mounted display 1000-2*b*, and/or a smart watch 1000-2*c*, and/or a vehicle electronic device 1000-3 including a display module, such as a Center Information Display (CID) and/or a room mirror display on an instrument panel, center fascia, and/or a dashboard of an automobile.

While the present disclosure has been particularly shown and described with reference to embodiments thereof, it will be understood by those of ordinary skill in the art that various changes in form and detail may be made therein without departing from the spirit and scope of the present disclosure as defined by the following claims.

What is claimed is:

1. A display device, comprising:
- a plurality of scan lines;
- a plurality of data lines;
- a display panel comprising a plurality of pixels connected to the plurality of scan lines and the plurality of data lines;
- a data driving circuit configured to output a plurality of data signals to the plurality of pixels via the plurality of data lines;
- a scan driving circuit configured to sequentially activate at least some of the plurality of pixels according to the data signals via the plurality of scan lines; and
- a driving controller configured to control the data driving circuit and the scan driving circuit,
- wherein the display panel comprises a first display area in which first pixels of the plurality of pixels are disposed and a second display area in which second pixels of the plurality of pixels are disposed, wherein the scan driving circuit is further configured to activate the first display area and the second display area at a first scan rate in a first operation mode and to activate the second display area at a second scan rate in a second operation mode, and wherein the second scan rate is lower than the first scan rate.

2. The display device of claim 1, wherein the driving controller is configured to output a first clock signal to the scan driving circuit in the first operation mode and to output a second clock signal to the scan driving circuit in the second operation mode, and wherein a frequency of the second clock signal is lower than a frequency of the first clock signal.

3. The display device of claim 2, wherein a reduction ratio of the frequency of the second clock signal relative to the frequency of the first clock signal is equal to a reduction ratio of the second scan rate relative to the first scan rate.

4. The display device of claim 1, wherein the scan driving circuit is configured to, in the first operation mode, output a first scan signal having a first pulse width to the plurality of scan lines to activate the first display area and the second display area and to, in the second operation mode, output a second scan signal having a second pulse width to the scan lines connected to the second pixels among the plurality of scan lines to activate the second display area, and wherein the first pulse width is smaller than the second pulse width.

5. The display device of claim 1, wherein a scan time for which the scan driving circuit activates the first display area and the second display area in the first operation mode is equal to a scan time for which the scan driving circuit activates the second display area in the second operation mode.

6. The display device of claim 1, wherein the second scan rate is lower than the first scan rate by a ratio corresponding to a proportion of a number of the second pixels among the plurality of pixels.

7. The display device of claim 1, wherein the scan driving circuit is configured to, in the second operation mode, sequentially activate the second display area in response to a start signal indicating a beginning of a frame, to deactivate the first display area in response to a masking signal indicating completion of activation of the second display area, and to reactivate the second display area.

8. The display device of claim 7, wherein the driving controller is configured to provide the start signal to the scan driving circuit when the first display area is deactivated in response to the masking signal.

9. The display device of claim 1, wherein the driving controller is further configured to:

provide, in the first operation mode, a first image data signal of the first display area and the second display area corresponding to one frame to the data driving circuit during a time for activating all of the plurality of scan lines; and provide, in the second operation mode, a second image data signal of the second display area corresponding to a plurality of frames to the data driving circuit during the time for activating all of the plurality of scan lines.

10. The display device of claim 1, wherein the scan driving circuit is further configured to sequentially activate the second pixels in the second display area row by row in the first operation mode before sequentially activating the first pixels in the first display area row by row.

11. A display device, comprising:

a plurality of scan lines;

a plurality of data lines;

a display panel comprising a plurality of pixels connected to the plurality of scan lines and the plurality of data lines;

a data driving circuit configured to output a plurality of data signals to the plurality of pixels via the plurality of data lines;

a scan driving circuit configured to activate at least some of the plurality of pixels according to the data signals via the plurality of scan lines; and a driving controller configured to control the data driving circuit and the scan driving circuit based on an image signal and a synchronization signal, wherein the display panel comprises a first display area in which first pixels of the plurality of pixels are disposed and a second display area in which second pixels of the plurality of pixels are disposed, and wherein the data driving circuit is configured, in a first operation mode, to output a data signal of the first display area and the second display area corresponding to one frame to the display panel during a frame section defined by the synchronization signal and, in a second operation mode, to output a data signal of the second display area corresponding to a plurality of sub-frames to the display panel during the frame section.

12. The display device of claim 11, wherein the driving controller is further configured to output a start signal to the scan driving circuit in the second operation mode, and wherein the start signal indicates a beginning of each of the plurality of sub-frames during the frame section.

13. The display device of claim 11, wherein the frame section in the first operation mode lasts for a first duration, and the frame section in the second operation mode lasts for a second duration, and wherein the second duration is longer than the first duration.

14. The display device of claim 13, wherein the data driving circuit is configured, in the second operation mode, to output the data signal of the second display area corresponding to one of the plurality of sub-frames to the display panel during the first duration.

15. The display device of claim 11, wherein the driving controller is further configured to output a first clock signal to the data driving circuit in the first operation mode and to output a second clock signal to the data driving circuit in the second operation mode, and wherein a frequency of the second clock signal is lower than a frequency of the first clock signal.

16. An electronic device, comprising:

a processor;

a memory having stored application programs for execution by the processor;

a display device, comprising:

a plurality of scan lines;

a plurality of data lines;

a display panel comprising a plurality of pixels connected to the plurality of scan lines and the plurality of data lines;

a data driving circuit configured to output a plurality of data signals to the plurality of pixels via the plurality of data lines;

a scan driving circuit configured to sequentially activate at least some of the plurality of pixels according to the data signals via the plurality of scan lines; and a driving controller configured to control the data driving circuit and the scan driving circuit, wherein the display panel comprises a first display area in which first pixels of the plurality of pixels are disposed and a second display area in which second pixels of the plurality of pixels are disposed, wherein the scan driving circuit is further configured to activate the first display area and the second display area at a first scan rate in a first operation mode and to activate the second display area at a second scan rate in a second operation mode, and wherein the second scan rate is lower than the first scan rate; and a user interface configured to sense user input via touch or cursor select of an icon presented on the display panel, wherein the processor is caused to execute one or more of the stored application programs upon receipt of the user input.

17. The electronic device of claim 16, wherein the stored application programs include one or more of a camera application, an audiovisual streaming application, or a telephone application.

18. The electronic device of claim 16, wherein the user interface is a touch screen embedded in the display panel, wherein the touch screen includes touch sensors for sensing a touch or a tap by a user.

19. The electronic device of claim 16, wherein the user interface includes an audio sensor embedded in the display panel, wherein the audio sensor is configured to receive voice commands to cause access to one or more of the application programs.

20. The electronic device of claim 16, wherein the user interface includes sensors for sensing eye movements installed in the display panel.

* * * * *